US009576206B2

(12) United States Patent
Churchill et al.

(10) Patent No.: US 9,576,206 B2
(45) Date of Patent: Feb. 21, 2017

(54) METHOD OF LOCATING A SENSOR AND RELATED APPARATUS

(71) Applicant: Isis Innovation Limited, Oxford (GB)

(72) Inventors: Winston Churchill, Oxford (GB); Paul Michael Newman, Oxford (GB)

(73) Assignee: Oxford University Innovation Limited, Oxford (GB)

( * ) Notice: Subject to any disclaimer, the term of this patent is extended or adjusted under 35 U.S.C. 154(b) by 0 days.

(21) Appl. No.: 14/375,407

(22) PCT Filed: Feb. 8, 2013

(86) PCT No.: PCT/GB2013/050299
§ 371 (c)(1),
(2) Date: Jul. 29, 2014

(87) PCT Pub. No.: WO2013/117940
PCT Pub. Date: Aug. 15, 2013

(65) Prior Publication Data
US 2014/0376777 A1 Dec. 25, 2014

(30) Foreign Application Priority Data

Feb. 10, 2012 (GB) .................... 1202344.6

(51) Int. Cl.
*G06K 9/00* (2006.01)
*G01C 21/26* (2006.01)
(Continued)

(52) U.S. Cl.
CPC .......... *G06K 9/00791* (2013.01); *G01C 21/26* (2013.01); *G01C 21/32* (2013.01); *G01S 19/48* (2013.01); *G06K 9/6202* (2013.01)

(58) Field of Classification Search
None
See application file for complete search history.

(56) References Cited

U.S. PATENT DOCUMENTS 5,999,866 A 12/1999 Kelly et al.
7,305,149 B2 12/2007 Yoshikawa et al.
(Continued)

FOREIGN PATENT DOCUMENTS

CN 1841023 A 10/2006
CN 102099656 A 6/2011
(Continued)

OTHER PUBLICATIONS

Kannan et al. NPL: (An Intelligent Driver Assistance System (I-DAS) for Vehicle Safety Modelling using Ontology Appoarch, International Journal of UbiComp (IJU), vol. 1, No. 3, Jul. 2010).*
(Continued)

*Primary Examiner* — Oneal R Mistry
(74) *Attorney, Agent, or Firm* — Fenwick & West LLP

(57) ABSTRACT

A method of localizing a vehicle hosting a sensor comprises capturing data from the sensor providing a sensed scene around the vehicle at a current time, processing the sensed scene to extract a set of features from the sensed scene and determine a position of the vehicle from the sensed scene in relation to a previous position of the sensor, comparing the extracted set of features to one or more stored experiences, wherein each stored experience comprises a plurality of sets of features, where each set of features has been determined from a previously sensed scene, to ascertain whether the sensed scene can be recognized within any of the stored experiences, and if the extracted set of features of the sensed scene are recognized then that stored experience is used to produce an estimate of the position of the vehicle at the current time with respect to the stored experience.

26 Claims, 12 Drawing Sheets

(51) Int. Cl.
    G01C 21/32    (2006.01)
    G01S 19/48    (2010.01)
    G06K 9/62     (2006.01)

(56)            References Cited

U.S. PATENT DOCUMENTS

| | | | |
|---|---|---|---|
| 2006/0132602 | A1 | 6/2006 | Muto et al. |
| 2007/0061076 | A1 | 3/2007 | Shulman |
| 2007/0088478 | A1* | 4/2007 | Mori .................. B60W 40/105 701/41 |
| 2007/0156286 | A1 | 7/2007 | Yamauchi |
| 2008/0181487 | A1 | 7/2008 | Hsu et al. |
| 2008/0320036 | A1* | 12/2008 | Winter .............. G06F 17/30265 |
| 2010/0021009 | A1* | 1/2010 | Yao .................... G06K 9/00785 382/103 |
| 2010/0070125 | A1 | 3/2010 | Lee et al. |
| 2011/0097014 | A1 | 4/2011 | Lin |
| 2011/0125374 | A1 | 5/2011 | Stam et al. |
| 2011/0243379 | A1* | 10/2011 | Miyajima ............. G01C 21/28 382/103 |
| 2011/0243457 | A1 | 10/2011 | Miyajima |
| 2011/0243459 | A1* | 10/2011 | Deng .................. G06K 9/6203 382/218 |
| 2012/0121161 | A1* | 5/2012 | Eade .................... G09B 29/007 382/153 |
| 2012/0308114 | A1 | 12/2012 | Othmezouri et al. |
| 2015/0049193 | A1 | 2/2015 | Gupta et al. |

FOREIGN PATENT DOCUMENTS

| | | | |
|---|---|---|---|
| CN | 102208035 A | 10/2011 | |
| DE | 102008041679 A1 * | 3/2010 | ............ G01C 21/32 |
| EP | 1 677 076 A2 | 7/2006 | |
| EP | 1 975 563 A2 | 10/2008 | |
| EP | 1 975 565 A2 | 10/2008 | |
| EP | 2 372 310 A2 | 10/2011 | |
| EP | 2 372 605 A2 | 10/2011 | |
| JP | 2003-263104 A | 9/2003 | |
| JP | 2005-006081 A | 1/2005 | |
| JP | 2008-059319 | 3/2008 | |
| JP | 2011-215053 A | 10/2011 | |
| WO | WO 2007/031947 A2 | 3/2007 | |

OTHER PUBLICATIONS

Besl, P. et al., "A Method for Registration of 3-D Shapes," IEEE Transactions on Pattern Analysis and Machine Intelligence, Feb. 1992, pp. 239-256, vol. 14, No. 2.
Bosse, M. et al., "Continuous 3d Scan-Matching with a Spinning 2d Laser," 2009 IEEE International Conference on in Robotics and Automation, ICRA'09, IEEE, May 12-17, 2009, pp. 4312-4319.
Levinson, J. et al., "Map-Based Precision Vehicle Localization in Urban Environments," in Proceedings of the Robotics: Science and Systems Conference, 2007, pp. 121-128.
Levinson, J. et al., "Robust Vehicle Localization in Urban Environments Using Probabilistic Maps," 2010 IEEE International Conference on IEEE in Robotics and Automation (ICRA), 2010, pp. 4372-4378.
Kummerle, R. et. al. "Autonomous Driving in a Multi-Level Parking Structure," IEEE International Conference on IEEE Robotics and Automation, 2009. ICRA'09, 2009, pp. 3395-3400.
Moosmann, F. et al., "Velodyne Slam" 2011 IEEE Intelligent Vehicles Symposium (IV), Jun. 5-9, 2011, pp. 393-398.
Morales, Y. et al., "Vehicle Localization in Outdoor Mountainous Forested Paths and Extension of Two-Dimensional Road Centerline Maps to Three-Dimensional Maps," Advanced Robotics, 2010, pp. 489-513, vol. 24, No. 4.
PCT International Search Report and Written Opinion, International Patent Application No. PCT/GB2013/050299, Oct. 17, 2013, 22 Pages.

PCT International Preliminary Report on Patentability, PCT Application No. PCT/GB2013/050299, Aug. 21, 2014, 16 pages.
PCT International Search Report, PCT Application No. PCT/GB2013/050858, Jul. 24, 2013, 3 Pages.
PCT Written Opinion, PCT Application No. PCT/GB2013/050858, Jul. 24, 2013, 6 Pages.
PCT International Preliminary Report on Patentability, PCT Application No. PCT/GB2013/050858, Oct. 7, 2014, 7 pages.
Bay, H., et al., "SURF: Speeded Up Robust Features," Proceedings of the Ninth European Conference on Computer Vision, May 2006, 14 Pages.
Biber, P., et al., "Dynamic Maps for Long-Term Operation of Mobile Service Robots," Proceedings of Robotics: Science and Systems, 2005, 8 Pages.
Bosse, M., et al., "Map Matching and Data Association for Large-Scale Two-dimensional Laser Scan-based SLAM," The International Journal of Robotics Research, vol. 27, No. 6, Jun. 2008, pp. 667-691.
Calonder, M., et al., "BRIEF: Binary Robust independent Elementary Features," Lecture Notes in Computer Science: BRIEF, 2010, 14 Pages.
Cornelis, N., et al., "Fast Scale Invariant Feature Detection and Matching on Programmable Graphics Hardware," IEEE Computer Society Conference on Computer Vision and Pattern Recognition Workshops, Jun. 23-28, 2008, Anchorage, Alaska, USA, 8 Pages.
Cummins, M., et al., "Highly Scalable Appearance—Only SLAM—FAB—MAP 2.0," Proceedings of Robotics: Science and Systems, Jun. 2009, Seattle, Washington, USA, 8 Pages.
Fillatreau, P., et al., "Localization of an Autonomous Mobile Robot from 3D Depth Images using heterogeneous Features," Proceedings of the 1993 IEEE/RSJ International Conference on Intelligent Robots and Systems, Jul. 26-30, 1993, Yokohama, Japan, 8 Pages.
Fraundorfer, F., et al., "Topological mapping, localization and navigation using image collections," Proceedings of the 20007 IEEE/RSJ International Conference on Intelligent Robots and Systems, Oct. 29-Nov. 2, 2007, San Diego, California, USA, 6 Pages.
Furgale, P., et al., "Visual Teach and Repeat for Long-Range Rover Autonomy." Journal of Field Robotics, vol. 27, No. 5, 2010, pp. 534-560.
Grisetti, G., et al., "A Tree Parameterization for Efficiently Computing Maximum Likelihood Maps using Gradient Descent," Proceedings of Robotics: Science and Systems, Jun. 2007, Atlanta, Georgia, USA, 8 Pages.
Intellectual Property Office of the United Kingdom, Patent Application No. GB1202344.6, Jun. 11, 2012, 2 Pages.
Konolige, K., et al., "View-Based Maps," Proceedings of Robotics: Science and Systems, Jun. 2009, Seattle, Washington, USA, 12 Pages.
Konolige, K., et al., "Towards Lifelong Visual Maps," The 2009 IEEE/RSJ International Conference on Intelligent Robots and Systems, Oct. 11-15, 2009, St. Louis, Missouri, USA, 8 Pages.
Mei, C., et al., "Efficient homography-based tracking and 3D reconstruction for single viewpoint sensors," IEEE Transactions on Robotics, vol. 24, Issue 6, Dec. 2008, 10 Pages.
Mei, C., et al., "RSLAM: A System for Large-Scale Mapping in Constant-Time using Stereo," International Journal of Computer Vision, vol. 94, Issue 2, Sep. 2011, 17 Pages.
Milford, M., et al., "Persistent Navigation and Mapping using a Biologically inspired SLAM System," The International Journal of Robotics Research, Jul. 21, 2009, 24 Pages.
Nistér, D., et al., "Visual Odometry for Ground Vehicle Applications," Journal of Filed Robotics, vol. 23, Issue 1, Jan. 2006, 35 Pages.
Patent Cooperation Treaty, International Search Report and Written Opinion, International Patent Application No. PCT/GB2013/050299, Oct. 17, 2013, 22 Pages.
Rosten, E., et al., "Real-time Video Annotations for Augmented Reality," Proceedings of the First international Conference on Advances in Visual Computing, Springer-Verlag Berlin, Heidelberg, Germany, 2005, 8 Pages.
Schindler, G., et al., "City-Scale Location Recognition," IEEE Conference on Computer Vision and Pattern Recognition, Jun. 17-22, 2007, Minneapolis, Minnesota, USA, 8 Pages.

(56) References Cited

OTHER PUBLICATIONS

Chinese Search Report, Chinese Application No. 201380008829X, Jan. 19, 2016, 2 pages.
Newman, P. et al., "SLAM-Loop Closing with Visually Salient Features," Proceedings of the 2005 IEEE International Conference on Robotics and Automation, Apr. 2005, pp. 644-651.
Japanese Office Action, Japanese Application No. 2014-556140, Sep. 1, 2016, 11 pages.

* cited by examiner (a) (b)

(c) (d)

(a) (b)

(c) (d)

METHOD OF LOCATING A SENSOR AND RELATED APPARATUS

Embodiments of this invention relate to methods of localising a vehicle, or a sensor arranged to be used on a vehicle, and related apparatus.

As localisation (ie determining the position) and mapping algorithms mature, the problem of truly long-term navigation is becoming more urgent. A common problem in robotic (in some embodiments this may be vehicle) navigation is needed in changing environments and is a major obstacle to realising lifelong autonomy. Traditional mapping approaches often create an initial map, which is typically a single monolithic approach (as a result of processes such as fusion or averaging), once on the initial visit and hope that this will be sufficiently close in appearance to be useful on subsequent visits. Recently there have been some attempts to combat these problems.

To achieve long term autonomy robotic systems should be able to function in changing environments which is seen in the art as a big challenge. Change can come from many sources: sudden structural change, lighting conditions, time of day, weather, seasonal change and the like. To illustrate, consider the problem of ego-motion estimation with a camera mounted on a robot operating outdoors. This is a richly mined area of research and immediately we reach for a visual navigation (Simultaneous Localisation And Mapping—SLAM) system that can map and localise all at once. However, when the location is revisited it may have changed drastically and for instance it may have snowed. As the seasons change, from summer to autumn the appearance of a scene may gradually change. The prior art suggests that it necessary to create a monolithic map containing information that allows localisation within the changing environment.

Konolige and Bowman ([1] K. Konolige and J. Bowman, "Towards lifelong visual maps," in *IROS*, 2009, pp. 1156-1163) develop their view-based maps system ([2] K. Konolige, J. Bowman, J. D. Chen, P. Mihelich, M. Calonder, V. Lepetit, and P. Fua, "View-based maps," *International Journal of Robotics Research (IJRR)*, vol. 29, no. 10, 2010) to adapt to change in an indoor environment. The system creates a skeleton graph of key-frames from a VO (Visual Odometry) system. The views stored at nodes are then updated and deleted based on a scheme designed to preserve view diversity while limiting the maximum number of views. Their skeleton map is in a single frame of reference and is incrementally optimised via Toro ([3] G. Grisetti, C. Stachniss, S. Grzonka, and W. Burgard, "A Tree Pa—rameterization for Efficiently Computing Maximum Likelihood Maps using Gradient Descent," *Robotics Science and Systems*, 2007). They show results for an office that includes moving people, furniture and changing lighting conditions.

Milford and Wyeth's RatSLAM system ([4] M. Milford and G. Wyeth, "Persistent navigation and mapping using a biologically inspired SLAM system," *The International Journal of Robotics Research*, 2009) uses the notion of an experience map which stores a collection of experiences. Their experiences are places in the world which also store transition information to other experiences to combat the problem of odometry drift. Over time the experience map is relaxed to minimise the difference between the absolute experience location and its transition information to others. Experiences are also deleted to keep the density down.

Biber and Duckett ([5] P. Biber and T. Duckett, "Dynamic maps for long-term operation of mobile service robots," in *Proceedings of Robotics: Science and Systems*, Cambridge, USA, June 2005) sample laser maps at a series of time scales to create a single map that has both long term and short term structure. This allows them to model both short term dynamic objects as well as long term structural change. They show improved localisation accuracy over the period of weeks for a busy lab environment.

We also note the work of Furgale and Barfoot ([6] P. Furgale and T. D. Barfoot, "Visual teach and repeat for long-range rover autonomy," *Journal of Field Robotics*, vol. 27, no. 5, pp. 534-560, 2010) who develop a teach and repeat system using vision in an outdoor environment. During the teach phase the robot creates a series of submaps using VO. A localisation module is then used to retrace the original path. They show results over several kilometers.

However, none of the above techniques satisfactorily cope with the changing environment which can be experienced as a sensor (or a vehicle carrying that sensor) moves through an environment.

According to a first aspect of the invention there is provided a method of localising a vehicle hosting a sensor comprising at least one of the following steps of:

a) capturing data from the sensor providing a sensed scene around the vehicle at a current time;

b) processing the sensed scene, where the processing determines a position of the vehicle from the sensed scene in relation to the position of the sensor at some earlier time;

c) comparing the sensed scene to one or more stored experiences to ascertain whether the sensed scene can be recognised within any of the or each stored experience;

d) if the sensed scene is recognised within a stored experience then that stored experience is used to produce an estimate of position of the vehicle at the current time with respect to the stored scene;

e) repeating at least some of steps a to d.

Embodiments providing such a method are believed advantageous since they are able to allow localisation of the vehicle within a changing environment more readily than prior art systems. Further, such embodiments means that data relating to the sensed scene only need be stored if the need arises and such a strategy helps to reduce the amount of storage that is needed together with the amount of processing that might be needed to process the stored data. As such, embodiments of the invention may be more accurate, require less memory than may be expected and be quicker than the prior art.

The term localising a vehicle is intended to relate to determining, from the data generated by the sensor, the position of the vehicle relative to an earlier time. Localisation is the ability to take data from the sensor, process that data in the presence of a prior representation (which is typically provided by a map or in some embodiments by a stored experience) of a scene and come up with a parameterisation of the vehicle pose (position) with respect to that prior representation. Typically in embodiments of the invention the prior representation is provided by a plurality of stored experiences.

Conveniently, the method is arranged such that if the current scene is not recognised within more than a predetermined number of the stored experiences then the method stores the sensed scene such that the sensed scene becomes a part of a new stored experience for future comparisons. Such embodiments are believed advantageous in that learn from their own experience. As the vehicle senses more scenes then the number of stored experiences that the vehicle can use in the future is likely to increase.

The approach used by embodiments of the invention notes that the features on a given tree in winter are simply not the features that are noted on the same tree in summer; the details seen on a wet road at high noon are different to those seen at dawn when the road is dry. Embodiments of the invention do not try to force things to be coherent. If, for example, an environment on Tuesday looks wildly different on Wednesday then embodiments would likely treat these as two independent experiences which equally capture the essence of that environment. Embodiments only tie them together topologically. Latterly, some embodiments may link stored experiences through the concept of places discussed below.

On an initial visit of a vehicle to a new area embodiments of the invention may save a constellation of visual features (typically provided by data generated from the sensor) as a new experience.

However, as the sensor/vehicle moves embodiments of the invention are arranged to attempt to localise the sensed scene within any saved experiences. As such, when revisiting the area the sensor/vehicle attempts to use the live stream of data (which may be images) to localise in any saved experiences. In some embodiments, the method may be arranged such that the stored experiences are generated by the vehicle/sensor that uses them.

However, in other embodiments, the stored experiences may be used by vehicles and/or sensors other than the vehicle/sensor that generated them. This may be in addition to being used by the vehicle and/or sensor that generated them. Such embodiments may be thought of as pooling the experiences allowing a plurality of vehicles to access the stored experiences. Such, a method may be advantageous since it would allow data to be built up and/or shared by a plurality of vehicles.

As the vehicle continues, still saving to this new experience, it may also be arranged to try to re-localise (ie recognise the sensed scene within a stored experience) in its previous, stored, experience(s). If re-localisation is successful at any point, saving to a new experience may be stopped and the method returns to localising in its previous experience.

Such a method will typically cause embodiments to store more representations for sensed scenes that change often, and fewer for sensed scenes that are more staid.

Thus, embodiments may handle new routes and complete localisation failures seamlessly—indeed it is typically the failure of localisation which drives the saving of a new experience. As such, a localisation failure may be thought of as being due to bad or unsolvable data association—what was there before is simply not there now.

In contrast to the previous approaches of the prior art, some embodiments may only store new experiences when the currently stored experiences are insufficient. Such a method should therefore result in each stored experience representing a different visual mode so deletion is not a concern. Embodiments may allow each experience to exist in its own frame of reference, and as such methods may allow localisation to be parallelised and allows the use of multiple experiences at any time. This may also allows different visual modes, which may be significantly different, to represent the same physical space.

In some embodiments, the data from the sensor may be part of a stream of data.

In one embodiment, the sensor is a stereoscopic pair of cameras. Thus, the output from the sensor of such an embodiment may be a stream of images and may be a stream of pairs of images.

The method may perform initial processing on the output of the sensor which may identify common features between pairs of images generated by a stereoscopic camera. The initial processing may generate a 3D model of the locale of the vehicle. Thus, some embodiments may extract a set of features from the sensed scene and use those extracted features in determining the position of the sensor, or vehicle, robot, etc. on which the sensor is mounted.

The 3D model may provide an experience to which reference may be later made. In some embodiments the experience may be provided by a plurality of sets of features, where each set of features is extracted from a given sensed scene. Typically, embodiments cause the sensor to generate a continual stream of 3D features (ie points within the data) relative to the trajectory of the vehicle. Thus, the trajectory may be thought of as a sequence of points at various moments in time which have stereo pairs attached to them, the relative pose to a previous point in time (image pair) and a plurality of 3D features.

The method may be arranged analyse the data from the sensor to determine 3D features (which may also be referred to as points or nodes) within the sensed scene and further to link those 3D features within an image (or other representation of the sensed scene generated by the sensor) at a first time, with a subsequent image at a second, later, time using a transformation. This linking may provide a trajectory for the sensor and/or vehicle.

The method may be arranged to determine landmarks within the images. A landmark may be a recognisable structure within the data from the sensor and will typically correspond to a real-world object. For example, a landmark may correspond to a corner of a building, a tree or the like.

In some embodiments of the invention the method may be arranged to generate a position of the landmark relative to the sensor and/or vehicle. In embodiments in which the sensor is a stereoscopic camera then the position of the landmark may be determined using information from both images.

Typically the method may locate a plurality of landmarks within any one sensed scene.

In other embodiments, the sensor may be provided with a laser scanner, radar, lidar (Light Detection and Ranging), 3D flash Lidar, Microsoft™ Kinect™, or the like.

The method may utilise a coarse positioning of the sensor (or vehicle on which it is mounted) to determine roughly the locality of the sensor. In particular, embodiments of the invention may use a Global Positioning System (GPS); one or more accelerometers or other such odometry system; or the like to identify the locality of the vehicle.

Embodiments may use the locality of the sensor (or vehicle on which it is mounted) to determine which stored experiences should be considered to determine whether a sensed scene can be recognised therewithin. As such, the locality of the sensor using the coarse positioning may be thought of as using a loop closer.

Other embodiments, which may be additional or alternative to the use of coarse positioning, may use an image matching technique to determine stored experiences which are visually similar to the sensed scene. Such embodiments are felt advantageous since visually similar stored experiences may provide good candidates for providing a match to the sensed scene.

The method may be arranged to run in parallel such that the method tries to recognise the sensed scene within a plurality of stored experiences at any one time. This may be thought of as running a plurality of localisers at any one time. In addition to recognising the sensed scene within the stored experiences the method may calculate a transformation from nodes located within the sensed scene to those nodes within the stored experience.

The method may require that the sensed scene can be recognised within a predetermined number of stored experiences before it is determined that the vehicle has been localised. An embodiment providing such a step is believed to provide a greater degree of certainty that the vehicle has in fact been localised correctly.

The method may be arranged to determine whether stored experiences relate to a similar place as one another. Should stored experiences be determined as being a similar place then embodiments may link such stored experiences. Embodiments linking stored experiences to form such places are believed advantageous since places can be used to assist recognition of the sensed scene within the stored experiences.

A stored experience may comprise any of the following: the raw data output from the sensor; the coarse position of the vehicle; the time of day; the date; the weather condition; nodes determined within the output from the sensor; the 3D map generated of the locale of the vehicle.

According to a second aspect of the invention there is provided a system arranged to localise a vehicle, the system comprising a sensor arranged to generate data representing a sensed scene around the vehicle at a current time, processing circuitry arranged to process the data wherein the processing may be arranged to perform at least one of the following:
  determine a position of the vehicle from the data relative to the position of the sensor at an earlier time;
  compare the data to one or more stored experiences, held within a storage device, to ascertain whether the sensed scene can be recognised within any of the stored experiences; and
  should the data allow the sensed scene to be recognised within any stored experience then use that stored experience to estimate the position of the vehicle.

The storage device may be provided by any suitable form of device such as a hard drive, an array of hard drives or the like. Indeed, the storage device may be distributed.

In some embodiments, at least a portion of the storage device may be mounted on the vehicle. In other embodiments, at least a portion of the storage device may be mounted off the vehicle and arranged to accessible from the vehicle.

The system may comprise a server arranged to communicate with the processing circuitry on the vehicle. The server may be arranged to communicate with the processing circuitry via any suitable network, which may include the Internet and/or wireless telecommunications networks such as 3G, 4G, WIFI, or the like.

The processing circuitry may be arranged to compare the data against a sub-set of the available stored experiences. In some embodiments, the processing circuitry may be arranged to obtain, from a remote storage device, the sub-set of available stored experiences, which may then be held locally on a storage device on the vehicle.

According to a third aspect of the invention there is provided a vehicle having a sensor mounted thereon, wherein the sensor is arranged to generate data representing a sensed scene around the vehicle at the current time, and a processing circuitry arranged to process the data wherein the processing circuitry may be arranged to perform at least one of the following:
  determine a position of the vehicle from the data relative to the position of the sensor at an earlier time;
  compare the data to one or more stored experiences to ascertain whether the sensed scene can be recognised within any of the stored experiences; and
  should the data allow the sensed scene to be recognised within any stored experience then use that stored scene to estimate the position of the vehicle.

According to a fourth aspect of the invention there is provided a server arranged to receive a network request from a network for one or more stored experiences, the server being arranged to process the request, to retrieve the requested stored experiences from a storage device and to transmit the requested stored experiences across the network.

According to a fifth aspect of the invention there is provided a machine readable medium containing instructions which when read by a machine cause that machine to perform as the method of the first aspect of the invention, as at least a portion of the system of the second aspect of the invention or as the processing circuitry of the vehicle of the third aspect of the system.

The machine readable medium referred to in any of the above aspects of the invention may be any of the following: a CDROM; a DVD ROM/RAM (including −R/−RW or +R/+RW); a hard drive; a memory (including a USB drive; an SD card; a compact flash card or the like); a transmitted signal (including an Internet download, ftp file transfer of the like); a wire; etc.

Features described in relation to any of the above aspects of the invention may be applied, mutatis mutandis, to any of the other aspects of the invention.

There now follows, by way of example only, a detailed description of embodiments of the invention, of which:

Figure 1:
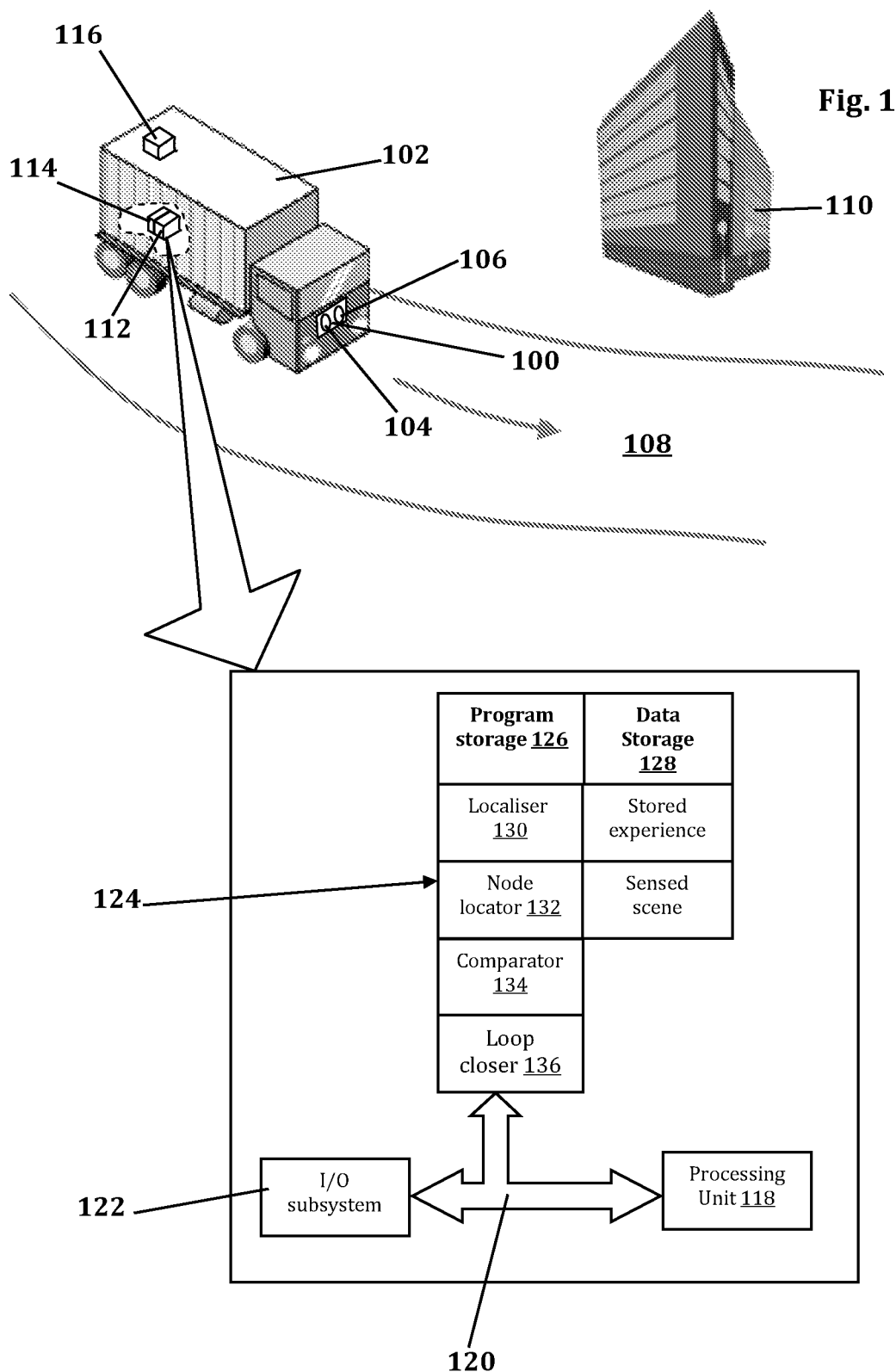
FIG. 1 is a schematic view of a vehicle utilising an embodiment of a vehicle to locate the vehicle relative to the vehicle's locale.
Figure 6:
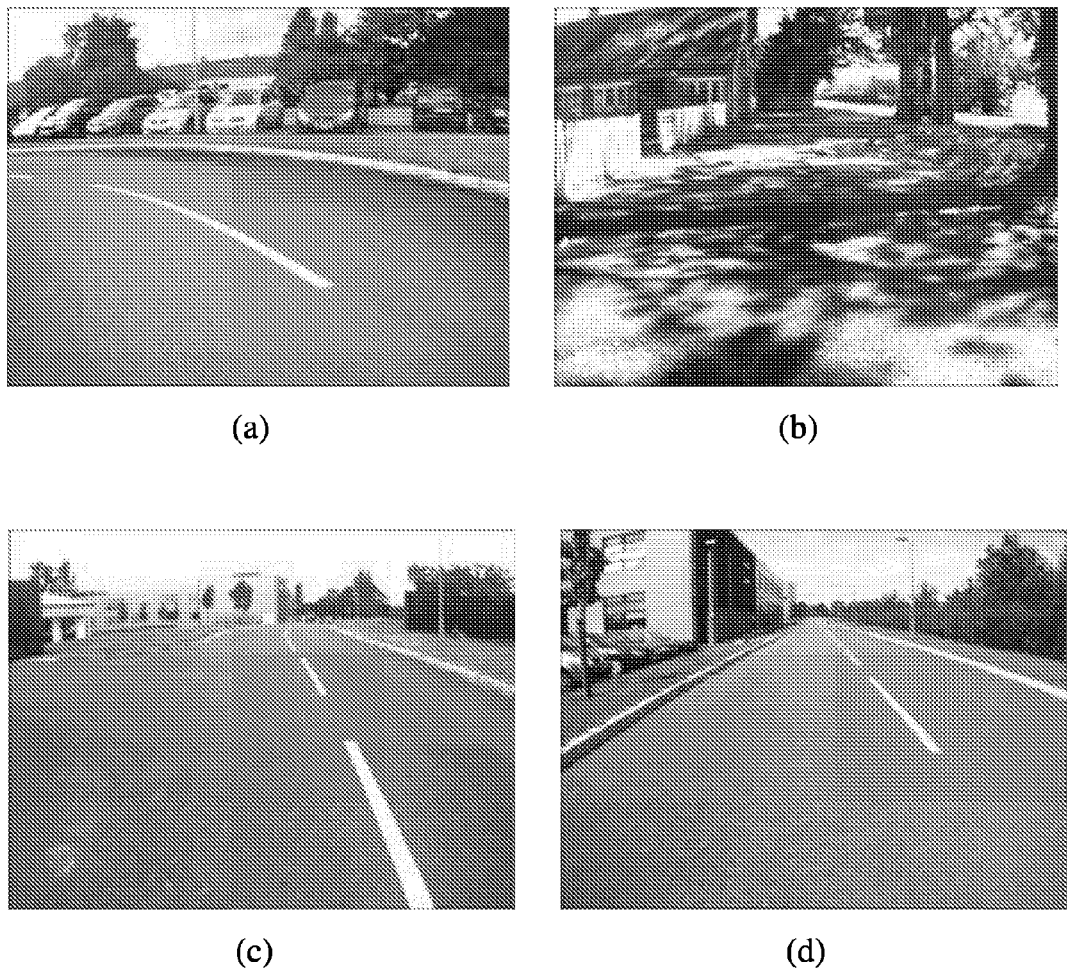
Figure 3:
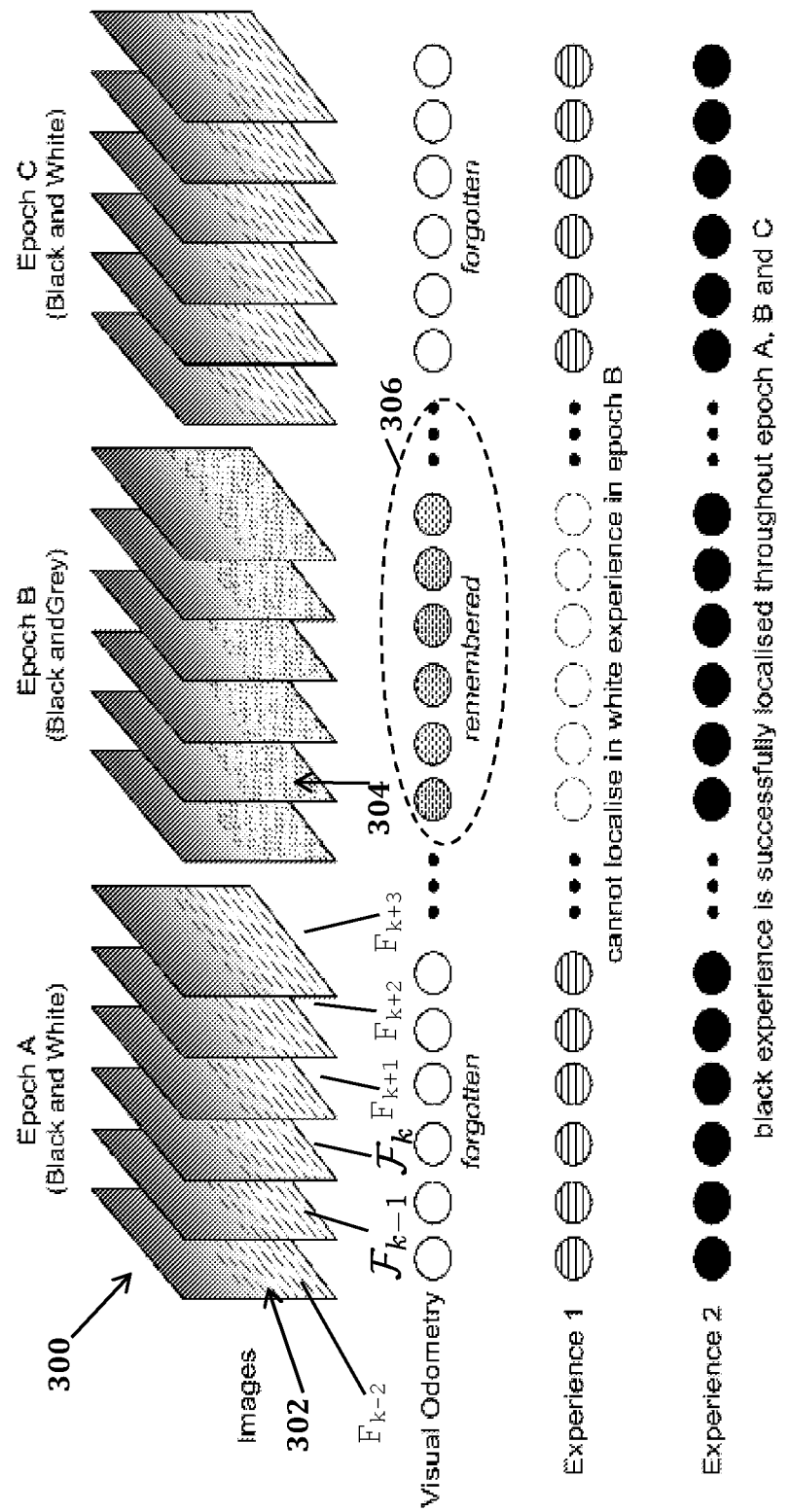
Figure 4:
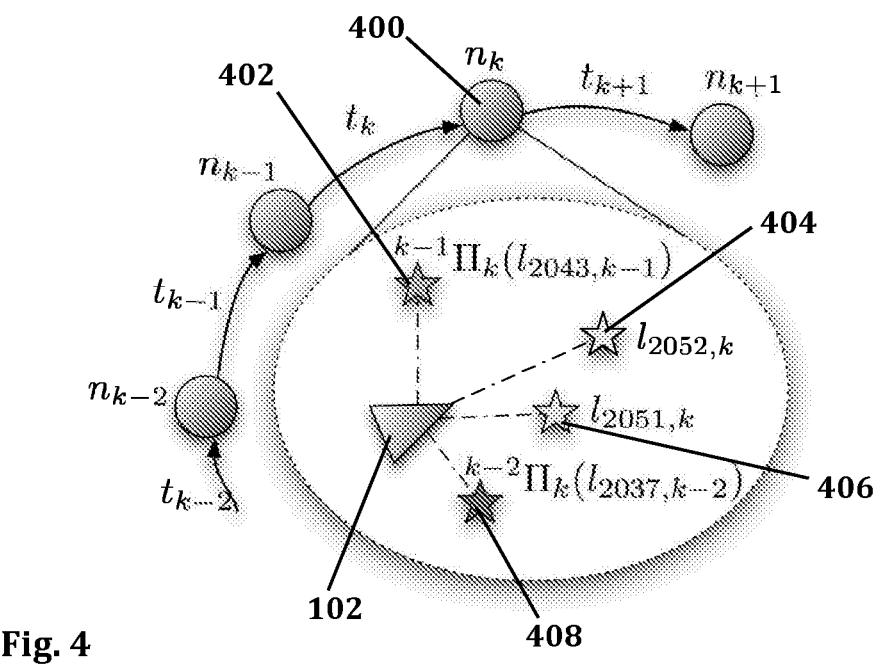
Figure 5:
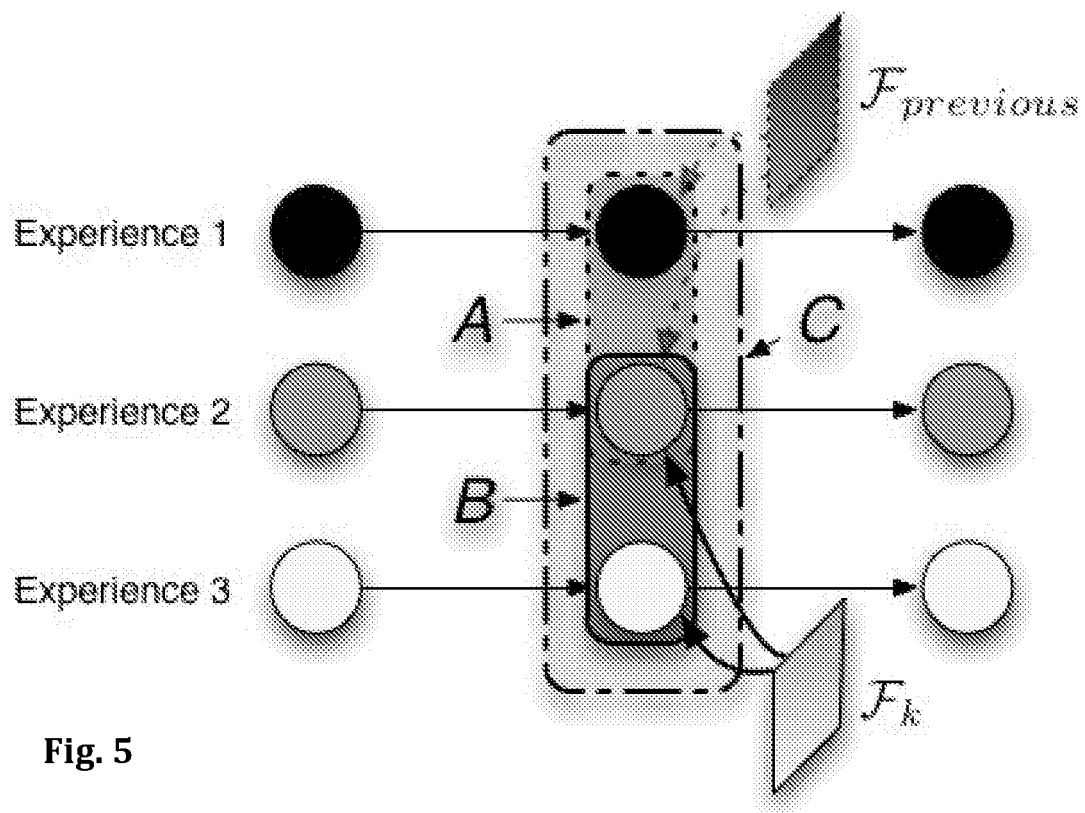
Figure 7:
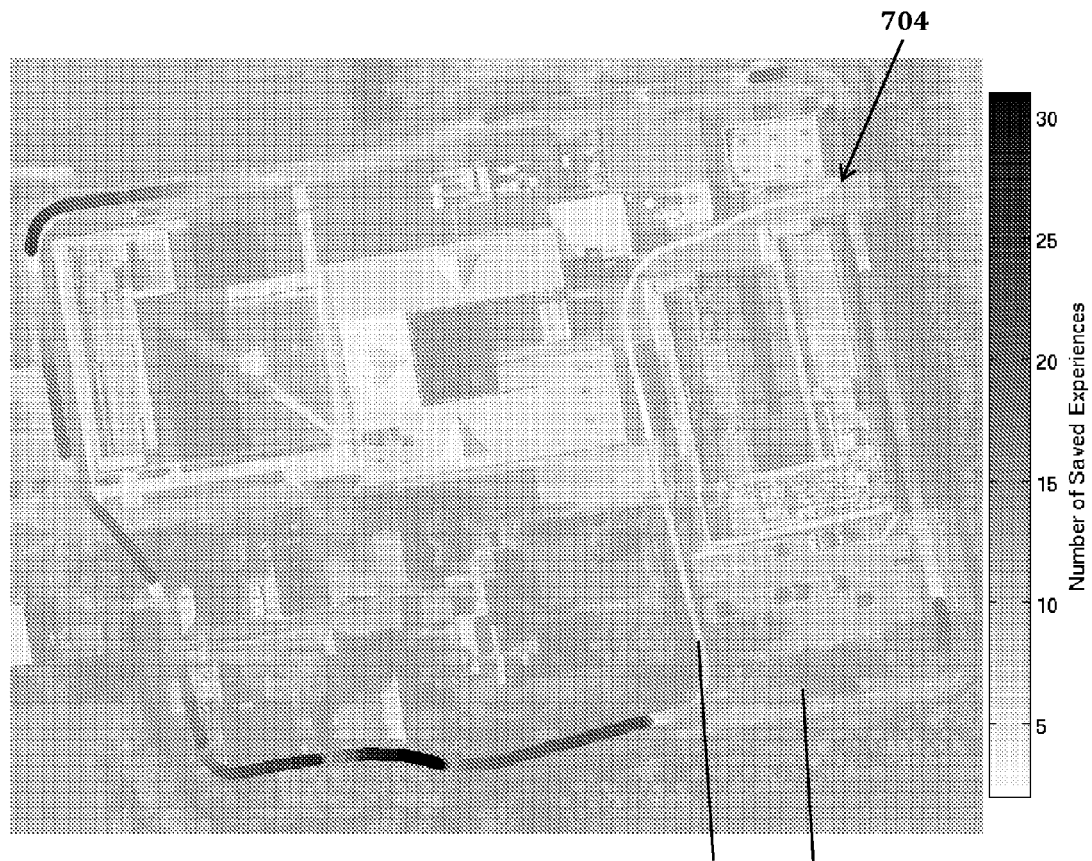
Figure 8:
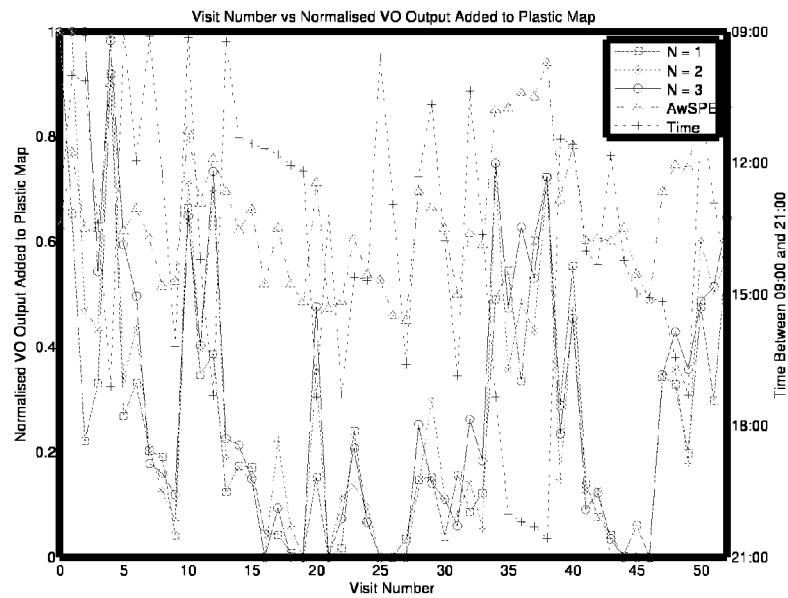
Figure 9:
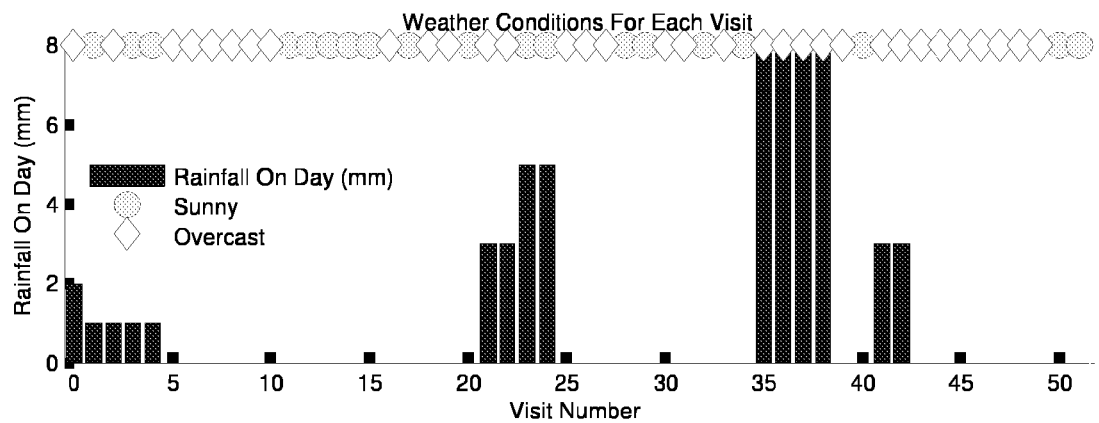
Figure 10:
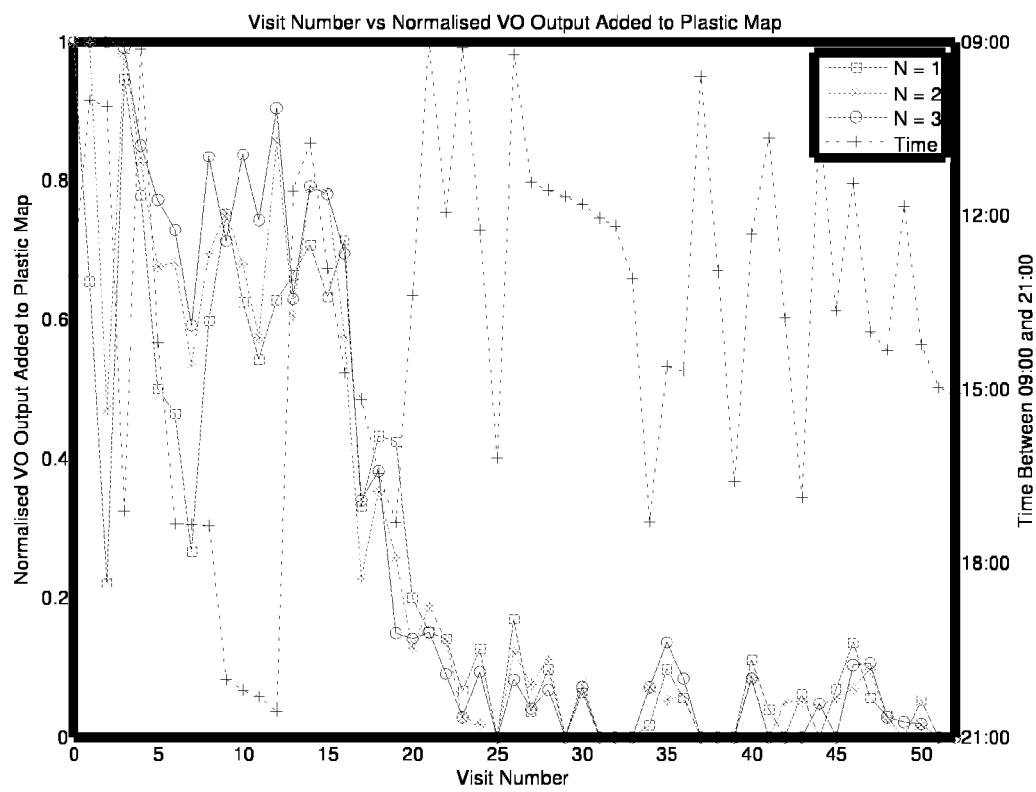
Figure 11:
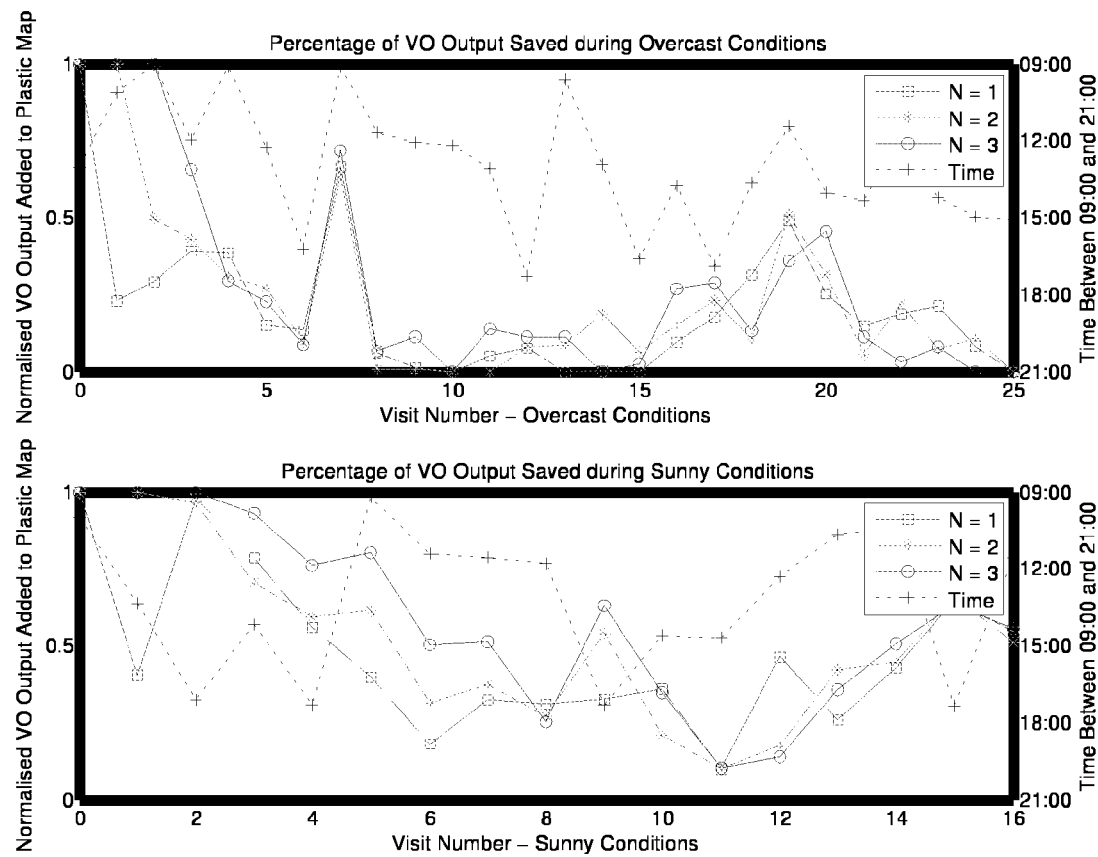
Figure 12:
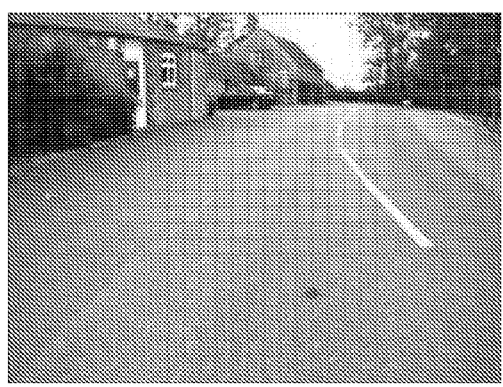
Figure 12:
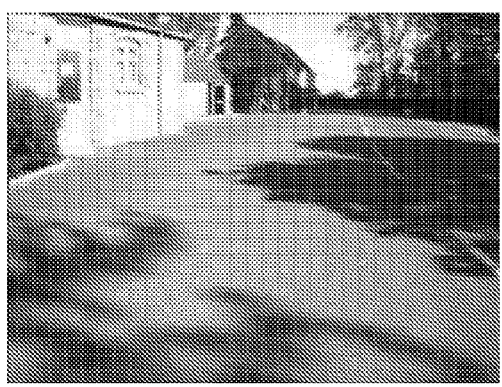
Figure 12:
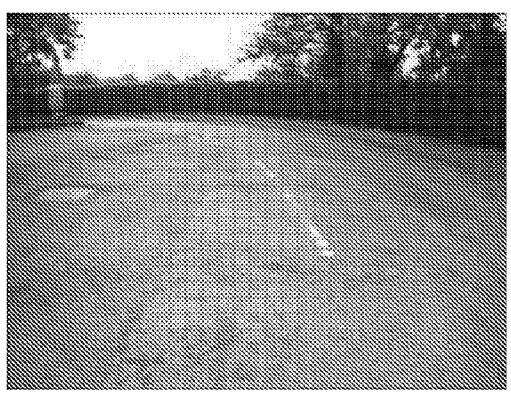
Figure 12:
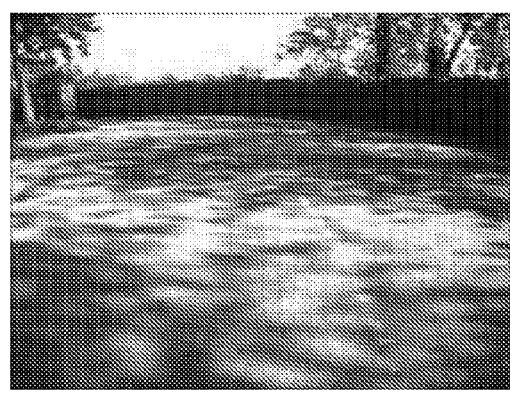
Figure 13:
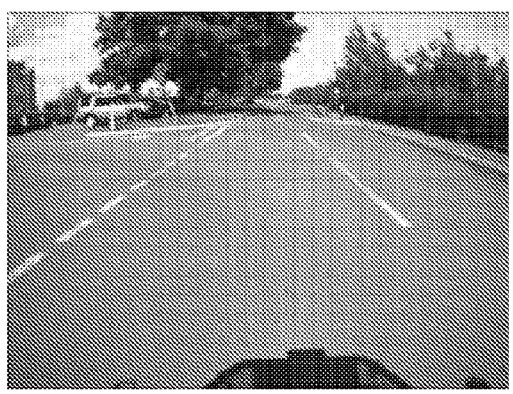
Figure 13:
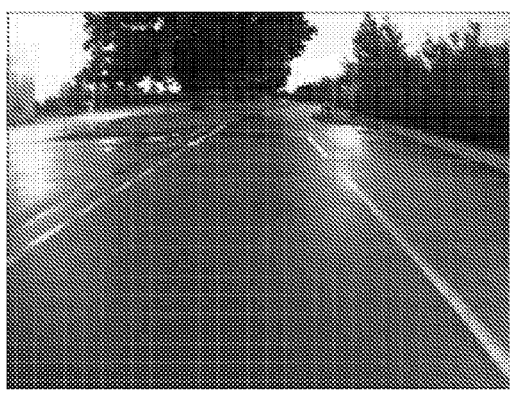
Figure 13:
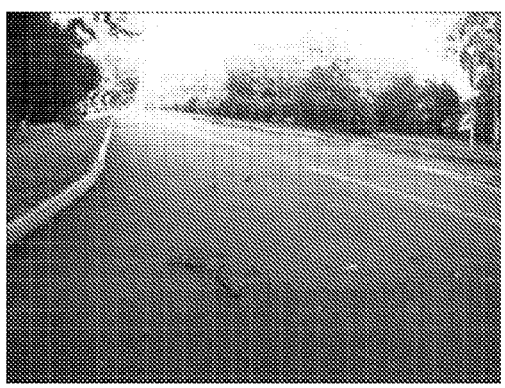
Figure 13:
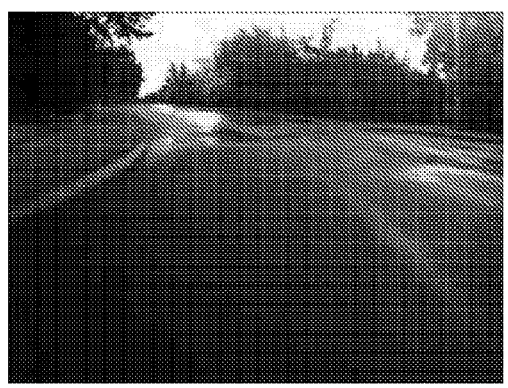
Figure 14:
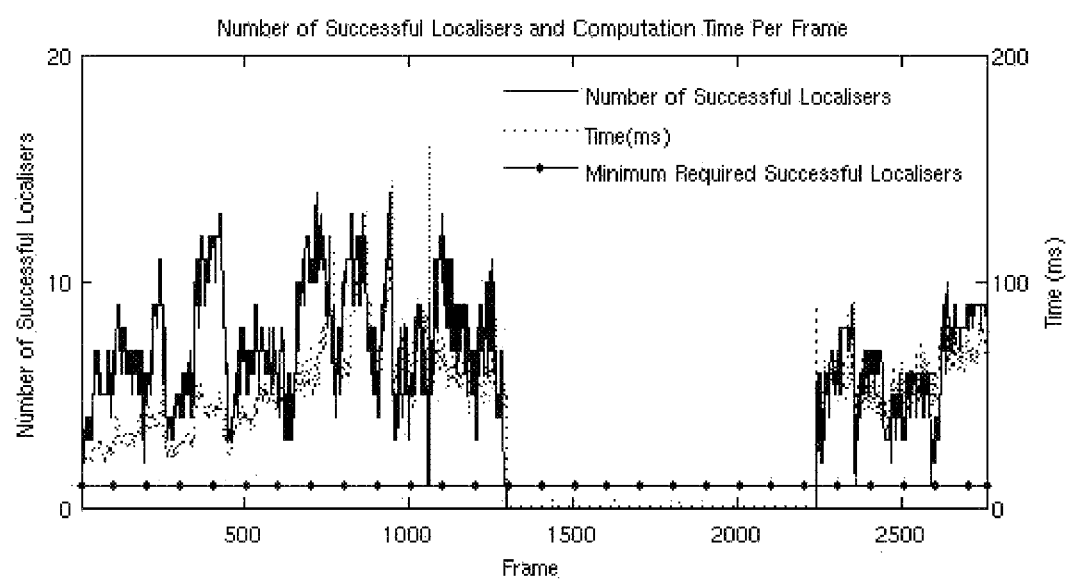
Figure 15:
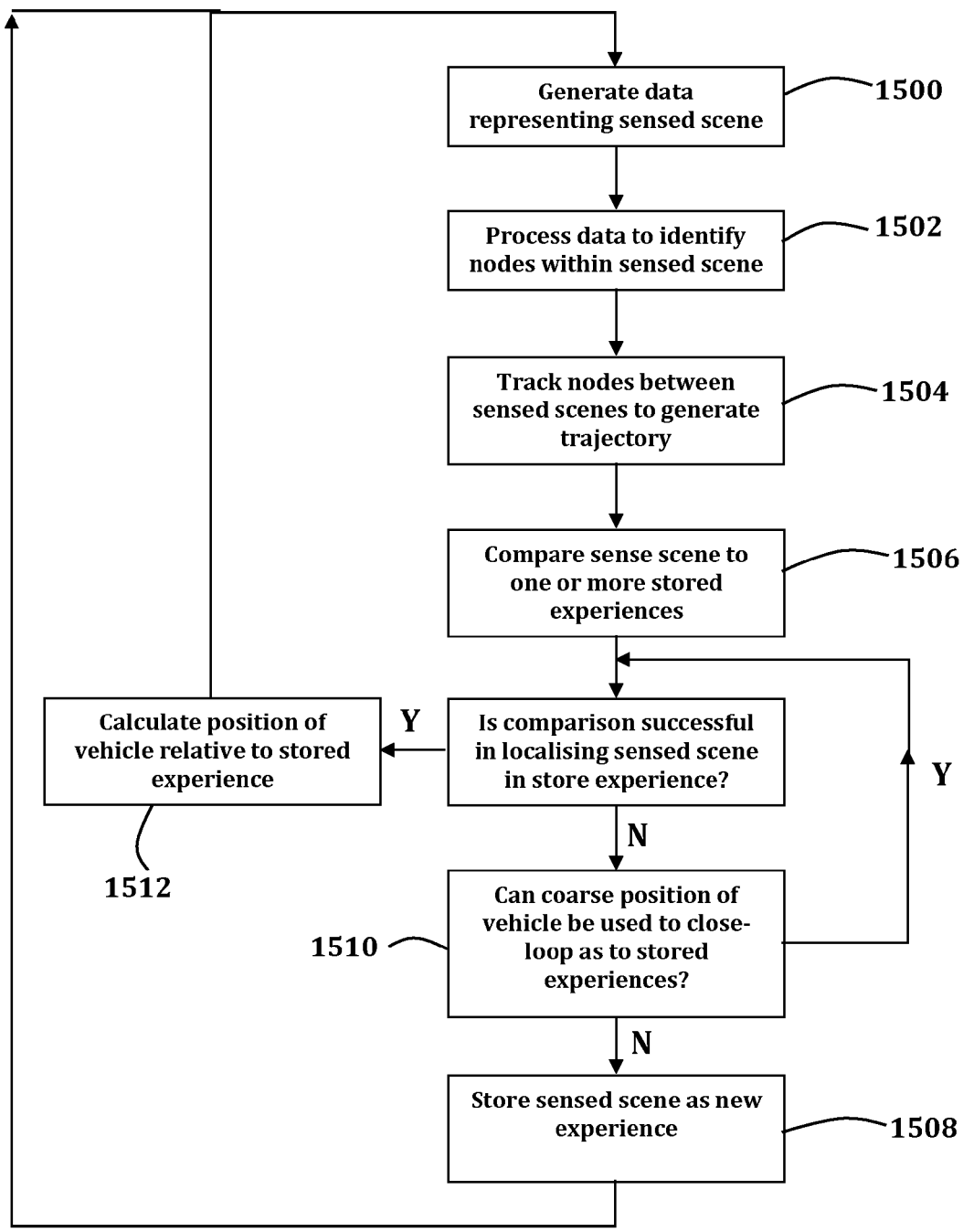

FIG. 3 schematically illustrates a method of an embodiment of the invention;

FIG. 4 schematically illustrates an output from a visual odometry system, for example, as used in in the vehicle of FIG. 1;

FIG. 5 schematically illustrates how data relating to a locale may be updated;

FIG. 6 provides further illustrations of scenes in which the locale changes often (a and b) or which remains relatively constant (c and d);

FIG. 7 illustrates the number of experiences generated and stored from multiple journeys around a track shown in the Figure;

FIG. 8 illustrates how the sensed scene was added to the stored experiences for traverses of a test circuit;

FIG. 9 shows the weather statistics for the journeys used to generate the results of FIGS. 7 and 8;

FIG. 10 illustrates the effect of reordering the data on how the currently sensed scene is stored as a stored experience;

FIG. 11 shows the effect of weather on how the sensed scene is stored as a stored experience;

FIG. 12 illustrates an example of localisation failure during a first journey around the track of FIG. 7;

FIG. 13 illustrates and example of localisation failure during a second journey around the track of FIG. 7;

FIG. 14 illustrates the timing performance of processing circuitry of the vehicle, illustrated in FIG. 1, during a third journey around the track of FIG. 7;

FIG. 15 is a flow chart outlining an example embodiment; and

Figure 16:
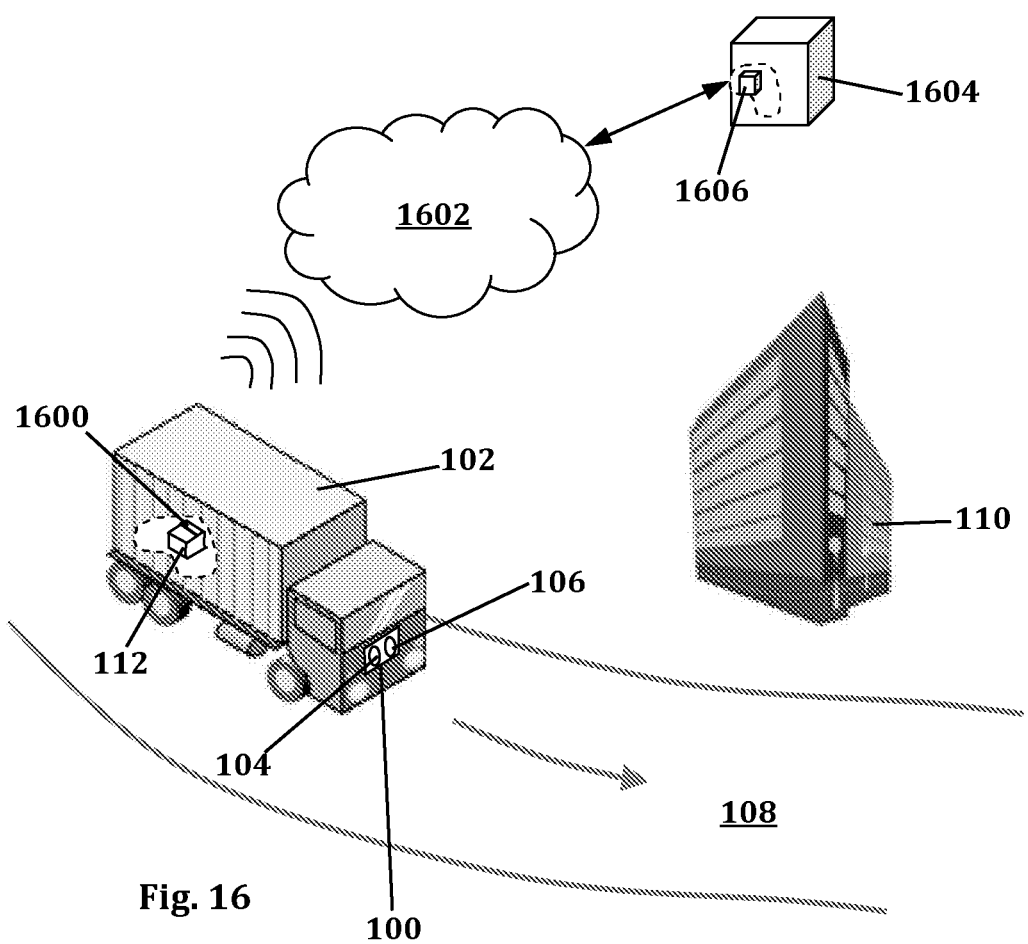

FIG. 16 shows a further, distributed, embodiment of the present invention.

Embodiments of the invention are described in relation to a sensor 100 mounted upon a vehicle 102 and in relation to the flow chart of FIG. 15. The sensor 100 is arranged to monitor its locale and generate data based upon the monitoring thereby providing data on a sensed scene around the vehicle 1500. In the embodiment being described, then since the sensor is mounted upon a vehicle 102 then the sensor 100 is also arranged to monitor the locale of the vehicle.

In the embodiment being described, the sensor 100 is a passive sensor (ie it does not create radiation and merely detects radiation) and in particular is a stereoscopic camera; it comprises two cameras 104, 106. The skilled person will appreciate that such a sensor could be provided by two separate cameras.

In other embodiments, the sensor 100 may comprise other forms of sensor such as a laser scanner or the like. As such, the sensor 100 may also be an active sensor arranged to send radiation out therefrom and detect reflected radiation.

In the embodiment shown in FIG. 1, the vehicle 102 is travelling along a road 108 and the sensor 100 is imaging the locale (eg the building 110, road 108, etc.) as the vehicle 102 travels. In this embodiment, the vehicle 102 also comprise processing circuitry 112 arranged to capture data from the sensor and subsequently to process the data (in this case images) generated by the sensor 100. Thus, the processing circuitry captures data from the sensor 100 which data provides a sensed scene from around the vehicle at a current time. In the embodiment being described, the processing circuitry 112 also comprises, or has access to, a storage device 114 on the vehicle.

The lower portion of the Figure shows components that may be found in a typical processing circuitry 112. A processing unit 118 may be provided which may be an Intel® X86 processor such as an I5, I7 processor or the like. The processing unit 118 is arranged to communicate, via a system bus 120, with an I/O subsystem 122 (and thereby with external networks, displays, and the like) and a memory 124.

The skilled person will appreciate that memory 124 may be provided by a variety of components including a volatile memory, a hard drive, a non-volatile memory, etc. Indeed, the memory 124 comprise a plurality of components under the control of the processing unit 118.

However, typically the memory 124 provides a program storage portion 126 arranged to store program code which when executed performs an action and a data storage portion 128 which can be used to store data either temporarily and/or permanently.

In other embodiments at least a portion of the processing circuitry 112 may be provided remotely from the vehicle. As such, it is conceivable that processing of the data generated by the sensor 100 is performed off the vehicle 102 or a partially on and partially off the vehicle 102. In embodiments in which the processing circuitry is provided both on and off the vehicle then a network connection (such as a 3G UMTS (Universal Mobile Telecommunication System) or WiFi (IEEE 802.11) or like).

It is convenient to refer to a vehicle travelling along a road but the skilled person will appreciate that embodiments of the invention need not be limited to land vehicles and could water borne vessels such as ships, boats or the like or indeed air borne vessels such as airplanes, or the like. Likewise, it is convenient in the following description to refer to image data generated by cameras 104, 106 but other embodiments of the invention may generate other types of the data.

The sensor 100, together with the processing circuitry 112 to which the sensor 100 is connected, together with the software running on the processing circuitry 112 form what is often termed a Visual Odometry (VO) system. In the embodiment being described, the visual odometry (VO) system continuously produces a (possibly ephemeral) 3D model of the world using the data generated from the cameras (104, 106). Typically, the VO system locates features (which may be referred to as nodes or points) within each image from the camera pair which can be located in both images. These features are then tracked between subsequent images (ie between a first or earlier time and a second, perhaps the current, time) to generate a trajectory of the vehicle 102.

This arrangement of cameras may be referred to as a stereo pair. In the embodiment being described, when the vehicle 102 is running, the VO system is always on, always consuming a live stream of data (ie images) from the cameras (104, 106) and estimating the relative transformations between the images generated from the two cameras 104, 106 (ie camera poses) to generate the trajectory and producing the position of the features relative to those camera poses. The stereoscopic nature of the cameras allows the 3D position of features to be calculated relative to the cameras.

As the sensor 100/vehicle 102 moves a plurality of sets of feature locations is generated; ie a set of features is generated from each scene. A plurality of sets of locations may be referred to as an experience. The processing circuitry 112 may be arranged to store at least one of the following meta data for an experience: the data generated from the sensor 100 (which in this embodiment is images from two cameras); the features (ie 3D feature locations); the time and/or date; the weather; the location (through Global Positioning System GPS or the like); a measure of luminance; traffic level, cloud cover, type of sensor, or the like.

Therefore, as the vehicle 102 moves an experience is stored as a set of relative poses and feature (ie node) locations. It should be noted that it is a set of relative poses that is stored. Embodiments of this invention will generally not operate using a single global frame. Embodiments of the invention render a metrically correct idea of camera motion and 3D feature locations in the vicinity of the sensor 100 current pose. Embodiments of the invention do not need to determine the location of things that are far away from the sensor and which cannot be detected (ie in this case seen) by the sensor 100. As described hereinafter, when the vehicle 102 revisits an area, localisation is attempted in previous (stored) experiences that are relevant to that area; such localisation may be thought of as trying to determine the position of the vehicle 102 from the sensed scene in relation to the position of the sensor at an earlier time wherein the position of the sensor at an earlier time is provided by the or each stored experience. In this context, localisation may be thought of as recognising the sensed scene, provided by the sensor 100 at the current time, within at least one of the stored experiences which provides the location of the sensor at an earlier time.

As such, and over time as the vehicle 102 moves around a set of experiences which are stored, each of which is independent from the other. A localiser may be associated with each of the stored experiences and be arranged to try and recognise the sensed scene within its stored experience. In other embodiments a localiser may be arranged to process a plurality of stored experiences.

Embodiments of the invention are arranged to process stored experiences to try and localise the current location of the vehicle 102/sensor 100 within those previous stored experiences; ie embodiments may compare the sensed scene to stored scenes in an attempt to localise the vehicle 102 (step 1506). As such, embodiments may be thought of as comprising a comparator 134 (ie a localiser). By localisation it is meant that the processing circuitry 112 can determine whether the current live image can be successfully matched against a previous (stored) experience. This localisation is performed by a localiser 130 running on the processing circuitry 112 and the localisation becomes possible by keeping the previous stored experiences independent.

Embodiments of the invention may also be arranged to determine landmarks within the sensed scene, which typically correspond to real-world objects, such as the corner of the a building or the like. Should a landmark be recognised within the sensed scene then the position of the landmark relative to the vehicle is determined. In the present embodiment, this is performed by a geometric calculation since the stereo camera pair provides two images in which the landmark can be found thereby giving sufficient information to determine the location of the landmark relative to the sensor. When a landmark is created then a patch of data is stored. In the embodiment being described this is pixel data and in one example a 9×9 grid of pixels is stored. Some embodiments may store any identified landmarks and/or patches of data as part of a stored experience In order to match the sensed scene against the stored experiences, some embodiments try to locate landmarks found in the stored experiences against landmarks located in the sensed scene. This may be achieved by trying to locate the patch of data (in this case the 9×9 grids of pixels) associated with landmarks in the stored scenes with those found in the sensed scene. In the embodiment being described, a localiser is associated with stored experience and looks for patches of data associated with landmarks in stored experience with which it is associated in the sensed scene.

Some embodiments may perform matching of the patches at a high level in order that suitable candidate patches can be located quickly and latterly perform a more detailed comparison to identify whether a match is actually deemed to have occurred.

Localisation in the previous experiences can be performed in parallel and allows the system to utilise relevant previous experiences. In reality, at runtime it is generally found that the number of active and successfully localised experiences is small. As described hereinafter, typically, each new experience is only created because the data can only be matched in less than a predetermined number (N) of stored experiences (in the embodiment being described, this means that the images generated by the cameras 104, 106 cannot be matched is 2 or more stored experiences and localisation cannot be performed). Therefore subsequent visits to an area should be able to localise in only a small number of stored experiences as they are by construction visually different. Thus, if the method determines that the sensed scene cannot be matched in enough experiences (ie more than the predetermined number), and thus localisation cannot be performed, the sensed scene is typically stored as a new stored experience which can be used for future comparisons step 1508.

Thus, embodiments of the invention provide a framework for long-term navigation in a changing environment. As described, in brief, above, the vehicle 102 constantly produces a 3D model of the environment from a VO system that takes the live image stream from the sensor 100 as its input. At the same time the processing circuitry 112 of the vehicle 102 opportunistically attempts to localise the current position in previously stored experiences.

If localisation is successful in a previous experience, embodiments assume that the representation of the current place to be sufficient and it is then possible to produce an estimate of position of the vehicle at the current time with respect to the stored scene. However if localisation cannot be performed in previous experiences, a new experience is created by saving the output of the VO system.

Experiences are denoted by $\epsilon$ and the jth experience is referred to as $^j\epsilon$. Thus, the set of all experiences creates a map, which is conveniently referred to as a plastic map. This map is given by equation (1).

$$PM = \{^j\epsilon\} \forall j \quad (1)$$

Typically, embodiments of the invention rely on the ability to navigate locally and to be able to "close the loop"; it to recognise when the vehicle 102/sensor 100 has returned to a previously visited place (previously stored experience).

Techniques to navigate locally are shown in various papers which provide trajectory estimation systems. In particular, a technique using a laser scanner are discussed in:

[7] M. Bosse and R. Zlot, "Map Matching and Data Association for Large-Scale Two-dimensional Laser Scan-based SLAM," *International Journal of Robotics Research*, vol. 27, pp. 667-691, 2008.

Techniques for trajectory estimation using a vision system are shown in the papers:

[8] D. Nister, O. Naroditsky, and J. Bergen, "Visual Odometry for Ground Vehicle Applications," *Journal of Field Robotics*, vol. 23, 2006.

[9] C. Mei, G. Sibley, M. Cummins, P. Newman, and I. Reid, "Real: A system for large-scale mapping in constant-time using stereo," *International Journal of Computer Vision*, pp. 1-17, 2010, special issue of BMVC.

The content of these papers is hereby incorporated by reference and the skilled person is directed to read and understand them, particularly with reference as to how a trajectory can be determined for the vehicle from the VO system.

Further loop-closure techniques which may be used to determine whether the current sensor data has been experienced in a previous experience are taught, in relation to a vision system in:

[10] M. Cummins and P. Newman, "Highly Scalable Appearance-Only SLAM FAB-MAP 2.0," in *Robotics Science and Systems,* 2009.

Again, the contents of this paper are hereby incorporated by reference and the skilled person is directed to read and understand them, particularly with reference to implementing a loop-closure system from the VO system. Such a system typically tries to locate images (ie provide image matching techniques) within the stored experiences which are visually similar to those of the sensed scene. As such, FABMAP may be thought of as a loop closer that can be used to trigger a localiser associated with a stored experience to try and localise that stored experience with the sensed scene.

The skilled person will also appreciate that Global Positioning Systems (GPS) are available which are able to provide a location to an accuracy of a few meters. Thus, embodiments of the invention may use the output from a GPS system 116, or other similar system, to give a rough, or coarse, position. The output of the GPS system 116 will typically be connected to the processing circuitry to allow the processing circuitry to identify a coarse position of the vehicle 102. The term coarse position is intended convey a meaning of relatively imprecise when compared to the positioning that is obtainable using processing of the data from the sensor 100.

However, embodiments of the invention, using the output from the sensor 100 may be able to determine the movement of the vehicle 102 relative to a previous stored experience to the order of millimeters, or at least a few centimeters.

Thus, as described above in broad terms, the VO system operates on a sequence of stereo frames $F^k = \{F_0, \ldots, F_k\}$.

At time k a stereo frame is processed and a camera node $n_k$ is linked to node $n_{k-1}$ by a 6 degree of freedom transform $t_k = [x, y, z, \theta_r, \theta_p, \theta_q]^T$ where $\theta r$, $\theta p$ and $\theta q$ are roll, pitch and yaw respectively. Thus, node $n_{k-1}$ may be thought of as occurring at a first time and node $n_k$ may be thought of as occurring at a second, later, time. As such, the processing circuitry 112 identifies nodes within the sensed scene 1502. These nodes can be tracked over a series of frames, as described hereinafter, to generate a trajectory for the vehicle 1504. Embodiments may be thought of as comprising a node locator to perform this function 132.

If new 3D landmarks are initialised as $F_k$ then these are also attached to the camera node $n_k$. We denote the ith such landmark attached to $n_k$, where i is a global index (so that every landmark has a unique ID), as $l_{i,k} = [x, y, z]^T$—a vector in the camera frame at time k. The camera node $n_k$ is also arranged to contain a list of all landmarks observed in $F_k$ many of which will be attached to other nodes—the ones in which they were initialised.

As such, a landmark described in frame p can be linked to a different frame q by transforming $l_{*,p}$ to $l_{*,q}$ by the operation represented by $^p\pi_q$ such that:

$$l_{*,q} \leftarrow {}^p\pi_q(l_{*,p}) \quad (2)$$

In the embodiment being described, the VO system runs continuously on the live frame stream (ie data) generated by the cameras 104, 106. If a new experience is being created (see discussion below as to when this occurs) then a new experience $^j\epsilon$ is created and the output from the VO system is stored in this experience. $^j\epsilon$ then, may therefore simply be a chain of camera nodes $n_k$, the inter-node transforms and associated 3D features. We refer to nodes in experiences as $^j\epsilon m$. Later we will explain how these chains are related (topologically) to form in concert a plastic map.

Thus, FIG. 4 illustrates how the experience is built up from the series of frames which are represented by nodes n. Each frame of the output from the VO system (represented by the circles) is denoted $n_{k-2}$ through $n_k$ to $n_{k+1}$; with the current frame $n_k$ referenced with numeral 400. Each of the nodes n are linked by the 6 degree of freedom transformation that describes the camera motion between $F_{k-1}$ and $F_k$.

Further, a series of landmarks 402, 404, 406, 408 are noted with the locale of the vehicle 102 within the current frame $F_k$. Each of these landmarks 402-408 can be transformed so that they are relative to k using equation 2 above.

As described in broad terms above, a localiser is used to try and localise the current location of the vehicle 102 within a previous experience. In broad terms this may be thought of as recognising the sensed scene within the previous experience (which may be a stored experience). More then one localiser may be provided and the or each localiser runs over a previous experience (ie a stored experience). Given a live frame $F_k$, the task of the or each localiser is to calculate the transformation from the frame $F_k$ to a node n in the previous experience.

Localisers operate in a similar way to the live VO system except the proposed landmark set comes from the saved experience, not the previous frame $F_{k-1}$. The landmarks are taken from the local region surrounding the previous position in the experience. Additionally, in the embodiment being described, the localiser does not attempt to add or update landmarks in either the current VO output or the previous experience. It is completely passive in terms of its impact on both; ie it does not modify the data of the current VO output or of the previous experience.

Localisers are arranged to know if it is "lost"; ie when the incoming frame $F_k$ can no longer be localised in the previous experience. There are many ways this can be calculated. Possibilities include the number of landmarks found and/or classified as inliers, and comparisons with the current VO output. The output of each localiser at each time step is a binary result indicating if it is still successfully localised:

$$L(^j\varepsilon, \mathcal{F}_k) = \begin{cases} 1 & \text{if localised} \\ 0 & \text{if lost.} \end{cases} \quad (3)$$

If successful, the localiser can be queried for the node in the experience that $F_k$ was nearest to.

$$m \leftarrow {}^j\epsilon(F_k) \quad (4)$$

Once a localiser is declared lost, it stays in this state until receives outside assistance, discussed below and which closes the loop again with the previous experience.

N is defined to be the minimum acceptable number of successful localisers at any time (ie a successful attempt to determine the current position within a previous experience or in further terms, N is a predetermined minimum number of stored experiences in which the sensed scene should be recognised before localisation is deemed to have occurred). For each frame $F_k$ the set of active experiences A is computed. For each experience in A, its associated localiser runs and the result is a binary vector S indicating the success or failure of each. If |S| falls below N a new experience $^j\epsilon$ is created and the VO output is saved until |S| returns to greater than or equal to N. This process is described by Algorithm 1:

---
Algorithm 1 Plastic Mapping
---

```
bool Saving
while 1 do
    F_k = GetFrame( )
    {n_k, t_k} ← VO(F_k)
    A = ComputeActiveLocalisers(PM)
    S = Localise(A, F_k)
    if |S| < N then
        Saving = True
        ^jE ← {^jE,^j Em}
    else if |S| >= N && Saving==True then
        Saving = False
        PM ← {PM,^j E}
    end if
end while
```
---

As such, if the sensed scene can be localised in more than N stored scenes, it is possible to determine the position of the vehicle 102 relative to those stored experiences—step 1512.

This algorithm can be explained with reference to FIG. 3 and in a top region of this FIG. 3 separate 'Epoch's' are shown, where each Epoch represents a set of frames $F_k$ from the output of the VO systems at three separate times. In this embodiment, the minimum number of successful localisers (N) has been set to two.

For the first Epoch A, to the left of the figure, each of the frames has been labelled $F_{k-2}$, through $F_k$ to $F_{k+3}$. Each of the other Epochs (B and C) could be similarly labelled but have not been for reasons of clarity.

Below each of the frames of the Epoch A through C, are three representations: The top row of circles represents the current output from the VO system; the second, middle, row of circles represents data stored in an experience 1; and the third, bottom, row of circles represents data stored in an experience 2.

In Epoch A, it can be seen that the images created by the sensor are a combination of two different trends of data which may be thought of as being black/grey 300 and horizontal solid lines 302. Looking at the Experience 1, it can be seen that there is a 'horizontal' solid line trend in the data and as such a localiser is able to localise the current images with Experience 1. Looking at Experience 2, it can be seen that there is a 'black/grey' trend in the data and as such a localiser is able to localise the current images with Experience 2. Noting that N=2 there is now no need to create a new experience since we are localised in the minimum number already and the VO output can simply be forgotten.

Moving to Epoch B, it can be seen that images created by the sensor are a combination of two different trends of data which may be though of as being black/grey 300 and horizontal dashed lines 304. Looking at the Experience 1, the solid horizontal line 302 trend cannot be localised in the current imagery. However, looking at Experience 2 it can be seen that there is a black/grey trend as in the current data and as such a localiser is still able to localise the current data within Experience 2. However, since N is set to 2 and only a single localisation has occurred the output of the VO system is now stored as a new experience 306.

Then moving onto Epoch C, the trend in the current images returns to black/grey and solid horizontal lines which can be localised in both Experience 1 and Experience 2. As such, the output from the VO system can again be forgotten.

The skilled person will appreciate that embodiments may store the VO output even if greater than N localisations were occurring but it is likely to be advantageous not to do so. Storing the data un-necessarily will lead to a greater accumulation of data and possible reduced performance of the system.

The plastic map (identified in equation (1)) therefor stores many experiences covering an unbounded spatial area, in addition to capturing different appearances of the same area, thus experiences will not all be relevant all the time; ie the VO system may be outputting information from a different spatial area and/or different visual appearance. The vehicle's spatial position in its environment will not be captured by all experiences. Therefore it is desirable to calculate which experiences are applicable for $F_k$. Experiences are not stored in a single frame of reference, so it is not possible to integrate local transforms to estimate the position in one from another.

To overcome not being able to estimate position in one frame from another, we introduce the idea of places, which create topological links between experiences. Places are referred to as P and the zth place as $P^z$.

$P^z = \{^j\epsilon m\}$, is the set of all nodes (taken from various experiences) which are known to have been concurrently localised against. Thus, $P^z$ is a set of camera frames viewing the same physical place.

When $F_k$ is simultaneously localised in more than one experience we can create a place. By querying each successful localiser for its nearest node, we can create a place with the set $\{^j\epsilon m\}_k$. However it is also possible a previously created place contains some of these nodes, in which case we merge the sets created from $F_k$ and the previous place.

$$P^z = P^z \cup \underbrace{\left[\bigcup_j {}^j\bar{\epsilon}(\mathcal{F}_k)\right]}_{\mathcal{F}_k} \qquad (5)$$

Where $P^z$ on the right hand side is potentially an empty set depending on whether the nodes generated from $F_k$ are in previous places. A simple example of place creation and merging is shown in FIG. 5 and also explained with reference to FIG. 3.

Referring initially to FIG. 3, it can be seen that there are in effect 3 experiences referred to in that Figure: the experience denoted by the solid horizontal line; the experience denoted by the black/grey; and the experience denoted by the dashed horizontal line. FIG. 5 also shows 3 experiences: Experience 1, 2 and 3 denoted by the circles of black, grey and white respectively.

FIG. 5 shows that a previous frame $F_{previous}$ it was possible to localise that frame in both Experience 1 and Experience 2 and thus generate a place A. However, in the current frame $F_k$ it is possible to localise in Experience 2 and Experience 3 and thus generate a place B. Accordingly, it can be concluded that places A and B actually refer to the same place (due to the inclusion of Experience 2 in both) and as such, the places A and B can be merged to create place C.

Thus, again referring to FIG. 3, it could be inferred that all three of the Experiences referred to therein (Experience 1; Experience 2 and the experience stored from the VO in Epoch B) all actually refer to the same place since Experience 2 is common to all three Epochs A to C.

Thus, and as discussed in relation to FIG. 3, places can be used to link experiences. We use the ability to query all places with a set of experience nodes, and receive the set of places which contain these nodes. This query is defined via $\Omega$.

$$\{P^z\} \leftarrow \Omega(\{^j\epsilon_m\}) \qquad (6)$$

1) Computing Relevant Experiences:

As noted above, not all stored experiences will be relevant for $F_k$ as the stored experiences will not necessarily cover the vehicle's current position. Therefore embodiments allow localisers to take two states, active and inactive. Before processing $F_k$ the set of successful localiser positions from the previous frame, $\{^j\epsilon m\}_{k-1}$, are used to generate the set of related places:

$$\{P^z\}_{related} \leftarrow \Omega(\{^j\epsilon_m\}_{k-1}) \qquad (7)$$

Each inactive localiser then queries $\{P^z\}_{related}$ for the presence of its own nodes, and if any are present, it activates itself at the retrieved position. When the vehicle 102 moves beyond the range of an experience (ie the localiser gets lost as described in relation to FIG. 3), the associated localiser sets itself to inactive.

2) Reinitialising Lost Localisers:

Localisers get lost because they can no longer track the current frame $F_k$ however this may only be a temporary state and the localiser may be able to re-localise itself within an experience. As such that localiser/experience may become relevant again a short while after the localiser initially becomes lost, and therefore it is embodiments attempt to reinitialise lost localisers. Failure to reinitialise lost localisers where possible would likely lead to the system saving more experiences than necessary with the associated problems of increased storage requirements for data and reduced processing performance in view of the extra data.

As such, embodiments of the invention may assess whether, given a known location in one experience, the position is known another experience through a places. Therefore, some embodiments may be arranged that lost localisers periodically query $\{P^z\}_{related}$ to see if they can be reinitialised.

Figure 2:
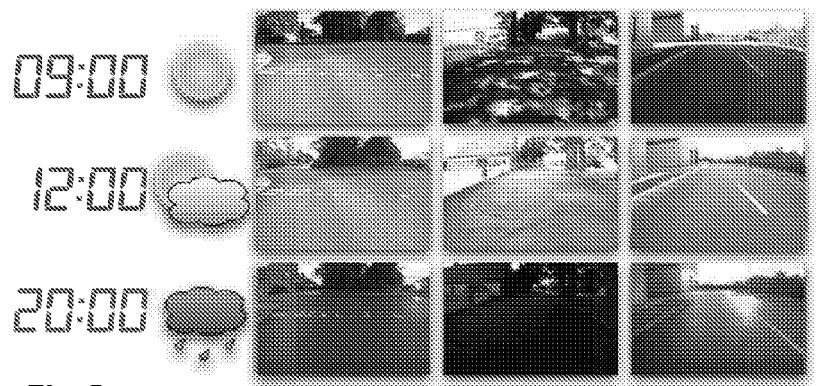
FIG. 2 is a series of photographs that illustrates how the locale of the vehicle may change according to the time and/or weather experienced of the locale.

Sometimes all of the localisation processes become lost, at which point the system does not know where it is in the plastic map. This may be because the current location has changed significantly (e.g. it snowed), or because the vehicle 102 is exploring a new route. For whatever the reason, the VO system will continue to process the live frame (data) stream and will be saving the output to a new experience as described in relation to FIG. 2 in relation to Epoch B. However it is possible the vehicle 102 will subsequently return to a place it can successfully localise in and regain its position in the plastic map; ie the vehicle 102 may be able, once again, to localise in a number of experiences greater than N. For a solution to this problem, which should become less and less frequent over repeated traverses, we use an external loop closer which can reinitialise lost localisers.

External loop closing is highlighted in relation FIG. 7 discussed below in the discussion of a vehicle re-joining a previously explored circuit from a new circuit.

However, in some embodiments, systems such as GPS, or the like, may be used to give a coarse position of the vehicle 102. In such embodiments the coarse position of the vehicle may be used by the processing circuitry to highlight which stored experiences are promising candidates to consider for localisation of the vehicle therewithin. As such, coarse positioning of the vehicle 102 may be used to help identify which stored experiences may be used to localise the vehicle 102—step 1510. Embodiments may be thought of as comprising a loop closer 136.

In embodiments of the invention it is generally the case that once the set of relevant localisers has been computed, each one becomes independent and so can be run in parallel. Given that the data association (ie matching the landmarks from a stored experience to each of the stereo camera frames of the sensed scene) and trajectory estimation steps (ie determination of the change in pose of the vehicle between the current and previous frame) dominate the computation time, by parallelising them embodiments are currently able to process frames at 15 Hz. The skilled person will appreciate that should further processing power be added then the frequency at which data can be handled will increase.

Whilst the skilled person will appreciate how to implement a system that is able to process and generate trajectories from a stream of sensor data, the following papers are provided as a reference. These papers are incorporated by reference and the skilled person is directed to read the relevant sections of these papers.

To achieve robust data association embodiments of the invention may use Binary Robust Independent Elementary Features (BRIEF) descriptors.

[11] M. Calonder, V. Lepetit, C. Strecha, and P. Fua, "BRIEF: Binary Robust Independent Elementary Features," in *European Conference on Computer Vision*, September 2010.

The BRIEF descriptor features are fast to compute and match only using a CPU of the processing circuitry 112 and are able to provide comparable performance to SURF [12].

[12] H. Bay, A. Ess, T. Tuytelaars, and L. V. Goo, "Surf: Speeded up robust features," *Computer Vision and Image Understanding (CVIU)*, vol. 110, pp. 346-359, 2008.

Embodiments of the invention may use GPU (Graphics Processing Unit) implementations of descriptors like SURF are available and allow frame rate performance:

[13] N. Cornelis and L. V. Gool, "Fast Scale Invariant Feature Detection and Matching on Programmable Graphics Hardware," in *Computer Vision and Pattern Recognition*, 2008.

However the matching step in each localiser and the live VO system requires access to a GPU (feature extraction on the incoming frame is independent and can be performed once at the start). As most systems only have one GPU at best, the requirement to use a GPU makes parallelisation difficult, compared to running a CPU-only program on a multi-core or multi-process system. As such, embodiments tend to use CPU based methods.

Embodiments may use the FAST corner extractor to compute points of interest for BRIEF:

[14] E. Rosten, G. Reitmayr, and T. Drummond, "Real-time video annotations for augmented reality," in *Advances in Visual Computing. LNCS* 3840, December 2005, pp. 294-302.

In some embodiments, matched landmarks may be refined to sub-pixel precision using efficient second-order matching, described by Mei:

[15] C. Mei, S. Benhimane, E. Malis, and P. Rives, "Efficient homography—based tracking and 3-d reconstruction for single-viewpoint sensors," *IEEE Transactions on Robotics*, vol. 24, no. 6, pp. 1352-1364, December 2008.

Data was collected from 53 traverses of two semi-overlapping 0.7 km routes around Begbroke Science Park. Data was collected over a three month period at different times of day and with different weather conditions using the group's survey vehicle, the Wildcat.

FIG. 7 shows an overhead of the site, along with the two routes driven by a vehicle, such as the vehicle 102. The outer loop 700, denoted by the thicker line, was driven on the first 47 traverses while the last 6 traverses went via the inner loop 702, indicated by the thinner line. The intensity of the plot indicates how many experiences have been laid down at each point and a scale is show to the right of the Figure. For illustrative purposes we controlled the signal from the external loop closer so it only fired at 14 predefined points on each loop. The points were spaced approximately evenly along each loop. As such, should localisers have become lost then they could be re-localised at these 14 predefined points. The skilled person will appreciate that other embodiments might implement this differently; perhaps randomly, substantially continuously, at predetermined time intervals or the like.

Some regions of the routes require more experiences than others. In FIG. 6 we show examples of places which exhibit both low and high visual variation. One example of a region that has high visual variation is a car park, FIG. 6(*a*). The contents and configuration of this space varies daily, so experiences stored on previous days are unlikely to be useful. Another is a section of road covered by overhanging trees, as shown in FIG. 6(*b*) Sunlight causes strong and intricate shadowing effects. While these are useful for the live VO system to provide landmarks therein, the located landmarks are often not encountered again meaning previous experiences are not useful. Images which have a high degree of visual variation encourage the use of the live VO system at all times.

In contrast FIGS. 6c and 6d show open stretches of road which, in similar weather conditions, have a fairly constant appearance.

FIG. 8 shows how much of each traverse is saved, along with the time of day it was captured. Here the visit numbers are in the order in which the data was collected. As such, it can be seen that to the left of the Figure, when the Plastic Map is relative in-extensive and not many experiences have been stored much of the VO output is stored. As the number of traverses increases the amount of VO output that is stored reduces as the vehicle 102 is able to localise itself in more of the previous experiences (as per the discussion in relation to FIG. 3 in which when localisation in greater than N experiences occurs new VO output may no longer be stored).

The large jump around traverses 35-38 happens because for the first time data was collected as dusk fell. The roads also had standing pools of water and it was raining lightly, something the system had not encountered before. FIG. 13 provides images generated by the sensor on traverse 38 and images b) and d) are generated on traverse 38 whereas images a) and c) where generated on earlier traverses and as such relate to stored experiences. Thus, it can be seen that the images generated on traverse 38 are different from those of earlier traverses.

The second spike at visit 47 is caused by driving the inner loop 702 for the first time. Suddenly no localisations are successful and the whole section is saved until the loop closer fires. The loop closer should be able to re-localise the position of the vehicle 102 when, or soon after, the inner loop 702 re-joins the outer loop 704 and the localisers are again able to localise within the stored experiences.

Describing FIG. 8 is slightly more detail, the graph shows (see left hand axis) the fraction of the VO output that is saved for future use. Also, the results highlight the effect of varying N (the minimum number of localizations that are required in order to decide that the vehicle 102 is not lost) and results are shown for minimum number of localisers N=1, N=2 and N=3 by varying the symbol used for each line of the graph.

For each traverse we also computed the fraction of the saved VO output when every other visit was used as a single available experience and averaged the results. We refer to this as Average with Single Previous Experience (AwSPE) and this is represented by the dashed line marked with triangles.

FIG. 12 shows examples of localisation failures on traverse 4, where strong shadowing effects are encountered for the first time: images a) and c) were generated from earlier traverses and stored as experiences whereas images b) and d) were generated on traverse 4.

Thus, as seen in relation to FIGS. 12 and 13, where situations arose which caused a large change in the environment (such as driving at dusk or a different route), it is found that as the vehicle 102 revisits the route it typically needed to remember less and less of the VO output on each traverse.

In order to evaluate the advantage of saving multiple experiences to build a plastic map as described in relation to embodiments of the invention as described above, experiments were run which tried to localise the current VO data in a single prior visit, i.e. making no attempt to capture the changing environment. For these experiments, the only stored experience was limited to being a selected example visit and in each traverse of the route the amount of VO output that needed to be saved was determined in each case, indicating localisation failure, and the results were averaged. Thus, as a first pass, traverse number 1 was taken to be the selected example and used as the only stored experience for traverse numbers 2 to 53. In a second pass, traverse number 2 was taken to be the selected example and used as the only stored experience for traverse numbers 1 and 3 to 53. This pattern was repeated until each of the traverses had been used as the selected example.

These are shown in FIG. 8, referred to as Average with Single Previous Experience (AwSPE). Across all visits, the average VO output saved is 65.8%, and no one visit is particularly "good" as a prior for other visits. This motivates the use of multiple experiences to represent the environment. Over time, baring new routes, embodiments which generate a plastic map as described above produces a 1/(TraverseCount) decay as the system captures the typical variation of the route.

The order in which the data were collected is a privileged sequence. However it could be ordered in 53! ways to produce different performance graphs. To make the point a greedy re-ordering was performed in which the 10 most surprising traverses of the outer route and the 6 inner traverses to the beginning and re-ran the system. The resulting performance graph is shown in FIG. 10. As such, the most "interesting" and "surprising" traverses have been moved to the beginning of the plastic map creation and it is noted that accumulation of experiences stays high (whilst the highly varying traverses are occurring) until traverse 18 before dropping off significantly.

It is also possible to classify each traverse as either overcast or sunny (the weather for each visit is shown in FIG. 9). In a further experiment the data was reprocessed using only overcast or sunny experiences and the results of which are shown in FIG. 11. (We removed the 4 dusk and 6 inner loop traverses.) Interestingly with the overcast only traverses (the top graph of FIG. 11), the system quickly accumulates sufficient experiences to manage cloudy conditions, while the sunny traverses (the bottom graph of FIG. 11) have a slight offset bias. It is believed that the slight offset bias is caused by shadowing effects making localisation in previous experiences difficult; such shadows can of course be seen in FIG. 6b.

Finally the performance of the system running on the test vehicle is shown in FIG. 14. Shown is the number of successful localisers and timing performance for each frame on traverse 47, which is the first traverse of the inner loop. Localisation is successful until frame 1296, at which point the vehicle turns onto the inner loop. At this point a new experience begins and there no localisation since there are no stored relevant experiences. At frame 2239 the external loop closer fires and results in successful localisation, so saving of the new experience stops. Despite varying numbers of active localisers the timing per frame typically stays under 100 ms, while the average for the successful localisation part of the sequence (i.e. not including frames 1296-2239) is 53 ms.

FIG. 16 shows an embodiment of the system which is modified when compared to the system in FIG. 1. However, for ease, like parts are referred to with like reference numbers. In this embodiment, the processing circuitry 112 is provided with a wireless communication means 1600 such as a 3G MODEM or the like. The wireless communication means 1600 allows the processing circuitry 112 to communicate, via the network 1602, with a remoter server 1604. The network can be any suitable network but may typically be the Internet. The skilled person will appreciate that whilst the server 1604 is represented as a single device in the Figure it may actually be a number of separate devices, which may be disparate from one another.

In an embodiment such as that shown in FIG. 16 it is conceivable that the remote server 1604 could share some of the processing load of processing the data generated from the sensor 100 (and/or the output from the VO system). However, the server may also store experiences which can be used to localise the vehicle 102.

As has been discussed above, data output from the sensor 100 may vary substantially according to the time of day, weather conditions, etc. As such, it is conceivable that only a sub-set of stored experiences will be useful for localising the vehicle 120 in its current locale.

As such, the remote server 1604 may be arranged to store, on a storage device 1606, a set of experiences and the vehicle 102 may be arranged to download a sub-set of the stored experiences. Thus, it will be appreciated that the storage device 1606 provides a storage device mounted off the vehicle 102. The sub-set of experiences may be downloaded to the vehicle 102 depending on various parameters including any one or more of the following: time day, weather conditions, intended route, location, or the like.

Indeed, should the vehicle 102 generate new experiences during a traverse that it makes then the vehicle 102 may be arranged to upload that new experience to the remote server 1604.

Indeed, the set of experiences held on the server 1604 may be generated by a plurality of vehicles. As such, the server 1604 may provide a repository of experiences which may be used by any number of vehicles wishing to localise themselves using those experiences.

As such, embodiments of the invention may demonstrate continuous localisation of the vehicle 120. This localisation may be in changing lighting and/or weather conditions over a period of time, which in the experiments was a 3 month period. Embodiments used what may be termed plastic mapping. As such, embodiments focus not on building a single monolithic map or inferring a latent underlying state which explains all observations of the workspace but on creating a composite representation constructed from multiple overlapping experiences. This representation (ie the plastic map) may only be as complex and rich as it needs to be. Embodiments will typically handle both drastic and creeping changes in the same way—as soon as prior experiences fail to adequately describe the present a new experience is saved for future reference. Experiments have shown the advantages of plastic maps in localisation performance (robustness) and, using the 3 months of data that has been obtained it has been possible to demonstrate the asymptotic behaviour of plastic map maintenance.

The skilled person will appreciate that many of the features described above could be implemented in software, firmware or hardware or indeed by a combination of these. As such, it is intended that systems implemented by any combination of these techniques is covered.

The invention claimed is:

1. A method of localizing a vehicle hosting a vehicle sensor comprising the steps of:
   a) capturing data from the vehicle sensor providing a single representation of an environment around the vehicle at a current time;
   b) processing the single representation to extract a set of features from the single representation and to determine, using the extracted features, a position of the vehicle from the single representation in relation to an earlier time, the determination made by:
      comparing the extracted set of features from the single representation to a plurality of collections of single representations representing a same physical space of the environment, wherein each collection includes a plurality of single representations and each single representation within the collections provides a set of features, determined from a previously sensed scene, against which the extracted set of features is compared to ascertain whether the single representation can be recognised within any of the plurality of stored collections of single representations; and
      recognizing a node within the single representation of the environment around the vehicle at the current time; and
   c) if the extracted set of features of the single representation are recognised within any one of the stored collections of single representations then that stored collection of single representations is used to produce an estimate of the position of the vehicle via linking the node at the current time with respect to a node in the stored collection of single representations.

2. A method according to claim 1 in which the method is arranged such that if the single representation of the environment is not recognised within more than a predetermined number of the stored collections of single representations then the method stores the single representation of the environment such that the single representation of the environment becomes a part of a new collection of single representations for future comparisons.

3. A method according to claim 2 in which the method continues to try and recognise the single representation of the environment within the stored collections of single representations as the method stores the single representation of the environment sensed.

4. A method according to claim 1 in which the stored collections of single representations are used by the vehicle/sensor that generated them.

5. A method according to claim 1 in which the stored collections of single representations are used by vehicles and/or sensors in addition to the vehicle/sensor that generated them.

6. A method according to claim 1 which analyses the extracted set of features and links features within the single representation at the current time, with features identified to be the same feature in a subsequent single representation of the environment at a second, later, time using a transformation to specify movement between the current time and the second time.

7. A method according to claim 6 which is arranged to generate a trajectory of the vehicle using the transformation that links features identified to be the same within single representation of the environment.

8. A method according to claim 1 which uses coarse positioning of the vehicle to determine roughly a locality of the vehicle.

9. A method according to claim 8 which uses the locality of the vehicle to determine which stored collections of single representations should be considered to determine whether a single representation of the environment can be recognised therewithin.

10. A method according to claim 1 which uses an image matching technique to determine stored collections of single representations which appear similar to the single representation of the environment and subsequently use single representation of the environment which appear similar to determine whether a single representation of the environment can be recognised therewith.

11. A method according to claim 1 in which the single representation of the environment is recognised within a predetermined number of stored collections of single representations before it is determined that the vehicle has been localised.

12. A method according to claim 1 which determines whether stored collections of single representations relate to a similar environments as one another and, should it be determined that stored collections of single representations relate to substantially the same environment, link such stored experiences.

13. A method according to claim 1 in which each stored collections of single representations exists in its own frame of reference.

14. A method according to claim 1 wherein each stored collections of single representations represents at least a portion of an environment through which the vehicle moves, and wherein each stored collections of single representations relates to
a different time and/or date of capture.

15. A method according to claim 1 in which at least some of the collections of single representations are captured by the vehicle sensor.

16. A method according to claim 1 in which at least some of the collections of single representations are captured by a sensor other than the vehicle sensor.

17. A method according to claim 1 in which each collection of single representations is independent from the others.

18. A method according to claim 1 in which the plurality of collections of single representations are downloaded to the vehicle.

19. A method according to claim 1, wherein the comparing further comprises:
comparing the extracted set of features from the single representation to the plurality of collections of single representations in parallel at a same time.

20. A method according to claim 1, wherein the comparing further comprises:
determining whether the node within the single representation of the environment around the vehicle at the current time is recognized within any one of the single representations within the stored collections of single representations.

21. A system arranged to localise a vehicle, the system comprising a vehicle sensor arranged to generate data representing a single representation of an environment around the vehicle at a current time, processing circuitry arranged to process the data wherein the processing is arranged to:
extract a set of features from the single representation to determine a position of the vehicle from the data relative to an earlier time, the determination made by comparing the extracted set of features to a plurality of stored collections of single representations representing a same physical space of the environment held within a storage device, wherein each collection includes a plurality of single representations and each single representation within the collections provides a set of features, to ascertain whether the single representation can be recognised within any of the stored collections of single representations;
recognize a node within the single representation of the environment around the vehicle at the current time; and
should the data allow the single representation to be recognised within any stored collections of single representations then use that stored collection of single representations to estimate the position of the vehicle via linking the node at the current time with a node in the stored collection of single representations.

22. A system according to claim 21 in which at least a portion of the storage device is mounted off the vehicle and arranged to accessible from the vehicle.

23. A system according to claim 21 which comprises a server arranged to communicate with the processing circuitry on the vehicle.

24. A system according to claim 21 in which the processing circuitry is arranged to compare the data against a sub-set of the available stored collections of single representations.

25. A system according to claim 24 in which the processing circuitry is arranged to obtain, from a remote storage device, the sub-set of available stored collections of single representations.

26. A vehicle having a vehicle sensor mounted thereon, wherein the vehicle sensor is arranged to generate data representing a single representation of an environment around the vehicle at the current time, and a processing circuitry arranged to process the data wherein the processing circuitry is arranged to:
extract a set of features from the single representation to determine a position of the vehicle from the data relative to an earlier time, the determination made by comparing the extracted set of features to a plurality of stored collections of single representations representing a same physical space of the environment held within a storage device, wherein each collection includes a plurality of single representations and each single representation within the collections provides a set of features, to ascertain whether the single representation can be recognised within any of the stored collections of single representations;
recognize a node within the single representation of the environment around the vehicle at the current time; and
should the data allow the single representation to be recognised within any stored collections of single representations then use that stored collection of single representations to estimate the position of the vehicle via linking the node at the current time with a node in the stored collection of single representations.

* * * * *